United States Patent
Mallaley et al.

(10) Patent No.: US 12,036,637 B2
(45) Date of Patent: Jul. 16, 2024

(54) PARTICLE BLAST APPARATUS

(71) Applicant: Cold Jet, LLC, Loveland, OH (US)

(72) Inventors: Daniel Mallaley, Cincinnati, OH (US); Richard Joseph Broecker, Milford, OH (US)

(73) Assignee: Cold Jet, LLC, Loveland, OH (US)

( * ) Notice: Subject to any disclaimer, the term of this patent is extended or adjusted under 35 U.S.C. 154(b) by 982 days.

(21) Appl. No.: 15/961,321

(22) Filed: Apr. 24, 2018

(65) Prior Publication Data

US 2019/0321942 A1 Oct. 24, 2019

(51) Int. Cl.
*B24C 7/00* (2006.01)
*B02C 4/32* (2006.01)
(Continued)

(52) U.S. Cl.
CPC .............. *B24C 7/0053* (2013.01); *B24C 5/04* (2013.01); *F15B 15/065* (2013.01); *F16K 31/1221* (2013.01); *F16K 31/1225* (2013.01); *F16K 31/535* (2013.01); *B02C 4/02* (2013.01); *B02C 4/32* (2013.01); *B24C 3/06* (2013.01)

(58) Field of Classification Search
CPC ........... B24C 7/0053; B24C 5/04; B24C 3/06; B24C 1/00; B24C 1/003; B24C 11/00; B24C 7/00; B24C 7/0046; B24C 7/0092; B24C 9/00; B24C 5/066; B24C 7/0069; B02C 4/02; B02C 4/32; B02C 4/286; B02C 4/30; B02C 4/08; B02C 11/04;
(Continued)

(56) References Cited

U.S. PATENT DOCUMENTS 2,699,403 A * 1/1955 Courts ...................... B60S 3/04
427/299
3,862,721 A * 1/1975 Flair ..................... B02C 18/142
241/293
(Continued)

FOREIGN PATENT DOCUMENTS

CN      101932409      12/2010
CN      103629389 A      3/2014
(Continued)

OTHER PUBLICATIONS

DE102011008139—Machine Translation (Year: 2012).*
(Continued)

*Primary Examiner* — Joel D Crandall
*Assistant Examiner* — Alberto Saenz
(74) *Attorney, Agent, or Firm* — Frost Brown Todd LLP

(57) ABSTRACT

A particle blast apparatus includes a metering portion, a comminutor and a feeding portion. The metering portion and comminutor may each be configured to provide uniformity in the discharge of particles. The metering portion controls the particle feed rate, and may include a rotor, which may have V or chevron shaped pockets. The comminutor includes at least one roller which may be moved between and including a position at which the gap of the comminutor is at maximum and a position at which the gap is at minimum. The metering portion may particles direction into the feeding portion without a comminutor being present. The comminutor may receive particles directly from a source of blast media without a metering portion being present.

12 Claims, 24 Drawing Sheets

(51) Int. Cl.
*B24C 5/04* (2006.01)
*F15B 15/06* (2006.01)
*F16K 31/122* (2006.01)
*F16K 31/53* (2006.01)
*B02C 4/02* (2006.01)
*B24C 3/06* (2006.01)

(58) Field of Classification Search
CPC .. B02C 1/00; B02C 23/08; B02C 4/00; B24B 19/00; B24B 57/04; B24B 1/00; B65G 65/48
USPC .............................. 451/90, 446; 241/DIG. 17
See application file for complete search history.

(56) References Cited

U.S. PATENT DOCUMENTS

| | | | |
|---|---|---|---|
| 4,087,074 A | 5/1978 | Massey et al. | |
| 4,094,470 A | 6/1978 | Waldhofer | |
| 4,304,176 A * | 12/1981 | Redl | B02C 11/08 99/278 |
| 4,333,612 A | 6/1982 | Hayashi | |
| 4,564,169 A | 1/1986 | Nordlund | |
| 4,744,181 A | 5/1988 | Moore et al. | |
| 4,843,770 A | 7/1989 | Crane et al. | |
| 4,947,592 A | 8/1990 | Lloyd et al. | |
| 4,973,001 A * | 11/1990 | Kastingschafer | B02C 4/32 100/170 |
| 5,018,667 A | 5/1991 | Lloyd | |
| 5,050,805 A | 9/1991 | Lloyd et al. | |
| 5,071,289 A | 12/1991 | Spivak | |
| 5,188,151 A | 2/1993 | Young et al. | |
| 5,249,426 A | 10/1993 | Spivak et al. | |
| 5,288,028 A | 2/1994 | Spivak et al. | |
| 5,301,509 A | 4/1994 | Lloyd et al. | |
| 5,383,610 A * | 1/1995 | Longhurst | B02C 4/32 241/30 |
| 5,473,903 A | 12/1995 | Lloyd et al. | |
| 5,520,572 A | 5/1996 | Opel et al. | |
| 6,024,304 A | 2/2000 | Sawada | |
| 6,042,458 A | 3/2000 | Lehnig et al. | |
| 6,325,308 B1 * | 12/2001 | Lofgren | D21D 1/306 241/28 |
| 6,346,035 B1 | 2/2002 | Anderson et al. | |
| 6,524,172 B1 | 2/2003 | Rivir et al. | |
| 6,695,679 B2 | 2/2004 | Anderson et al. | |
| 6,695,685 B2 | 2/2004 | Stratford et al. | |
| 6,726,549 B2 | 4/2004 | Rivir et al. | |
| 6,739,529 B2 | 5/2004 | Linger et al. | |
| 6,824,450 B2 | 11/2004 | Opel | |
| 7,112,120 B2 | 9/2006 | Rivir et al. | |
| 7,950,984 B2 | 5/2011 | Rivir et al. | |
| 7,959,099 B1 * | 6/2011 | Cox | B02C 18/145 241/294 |
| 8,187,057 B2 | 5/2012 | Broecker | |
| 8,277,288 B2 | 10/2012 | Spivak et al. | |
| 8,430,722 B2 * | 4/2013 | Raeder | B24C 1/003 451/99 |
| 8,869,551 B2 | 10/2014 | Young et al. | |
| 9,095,956 B2 | 8/2015 | Broecker et al. | |
| 9,550,843 B2 * | 1/2017 | Matsumoto | C08F 22/02 |
| 9,592,586 B2 | 3/2017 | Lehnig et al. | |
| 9,931,639 B2 | 4/2018 | Lehnig | |
| 2002/0074438 A1 * | 6/2002 | Horigane | B02C 23/08 241/236 |
| 2003/0199232 A1 | 10/2003 | Rivir et al. | |
| 2003/0224704 A1 | 12/2003 | Shank | |
| 2006/0178092 A1 | 8/2006 | Spivak et al. | |
| 2009/0093196 A1 | 4/2009 | Dressman | |
| 2010/0044479 A1 * | 2/2010 | Euculano | B02C 23/08 241/23 |
| 2012/0017634 A1 * | 1/2012 | Dorman | F04C 28/08 62/498 |
| 2012/0291479 A1 | 11/2012 | Moore et al. | |
| 2014/0110510 A1 | 4/2014 | Rivir et al. | |
| 2015/0093273 A1 * | 4/2015 | Johnson | F04C 28/08 418/1 |
| 2015/0166350 A1 | 6/2015 | Fritz et al. | |
| 2015/0196921 A1 | 7/2015 | Lehnig | |
| 2015/0375365 A1 * | 12/2015 | Lehnig | B24C 5/06 451/39 |
| 2016/0257506 A1 * | 9/2016 | Mallaley | B65G 53/16 |
| 2017/0000031 A1 * | 1/2017 | Horning, Jr. | A01D 43/10 |
| 2017/0106500 A1 * | 4/2017 | Mallaley | B02C 4/02 |
| 2020/0129984 A1 * | 4/2020 | Kasseckert | B02C 4/08 |

FOREIGN PATENT DOCUMENTS

| | | | | |
|---|---|---|---|---|
| CN | 105229314 A | 1/2016 | | |
| CN | 107820454 A | 3/2018 | | |
| DE | 102004045770 B3 | 9/2005 | | |
| DE | 102004057665 A1 | 6/2006 | | |
| DE | 102010004211 A1 | 7/2011 | | |
| DE | 102010004211 A1 * | 7/2011 | | B24C 1/003 |
| DE | 102011008139 | 7/2012 | | |
| DE | 102011008139 A1 * | 7/2012 | | B24C 1/003 |
| DE | 102011106860 A1 | 1/2013 | | |
| EP | 1637282 A1 | 3/2006 | | |
| EP | 2994268 | 3/2016 | | |
| FR | 2457425 A1 | 12/1980 | | |
| GB | 764127 A | 12/1956 | | |
| JP | S59-26811 A | 2/1984 | | |
| JP | H02-233121 A | 1/1990 | | |
| JP | 2009-214959 A | 9/2009 | | |
| RU | 2478434 C2 | 4/2013 | | |
| SU | 1240412 A1 | 6/1986 | | |
| SU | 1524925 A1 | 11/1989 | | |
| WO | WO910449 A1 * | 4/1991 | | |
| WO | WO 94/16861 | 8/1994 | | |
| WO | WO 2002/060647 A1 | 8/2002 | | |
| WO | WO 2014/182254 | 11/2014 | | |
| WO | WO 2015/109354 | 7/2015 | | |
| WO | WO 2017/070221 A1 | 4/2017 | | |

OTHER PUBLICATIONS

International Search Report and Written Opinion dated Feb. 6, 2017 for International Application No. PCT/US2016/057718, 10 pages.
U.S. Appl. No. 61/589,551, filed Jan. 23, 2012.
U.S. Appl. No. 61/592,313, filed Jan. 30, 2012.
U.S. Appl. No. 62/129,483, filed Mar. 6, 2015.
International Search Report and Written Opinion dated Sep. 17, 2019 for International Application No. PCT/US2019/028852, 22 pages.

* cited by examiner

PARTICLE BLAST APPARATUS

TECHNICAL FIELD

The present invention relates to methods and apparatuses which entrain blast media particles in a flow, and is particularly directed to methods and apparatuses for controlling the feed rate of blast media as well as for controlling the size of cryogenic blast media.

BACKGROUND

Carbon dioxide systems, including apparatuses for creating solid carbon dioxide particles, for entraining particles in a transport gas and for directing entrained particles toward objects are well known, as are the various component parts associated therewith, such as nozzles, are shown in U.S. Pat. Nos. 4,744,181, 4,843,770, 5,018,667, 5,050,805, 5,071,289, 5,188,151, 5,249,426, 5,288,028, 5,301,509, 5,473,903, 5,520,572, 6,024,304, 6,042,458, 6,346,035, 6,524,172, 6,695,679, 6,695,685, 6,726,549, 6,739,529, 6,824,450, 7,112,120, 7,950,984, 8,187,057, 8,277,288, 8,869,551, 9,095,956, 9,592,586 and 9,931,639 all of which are incorporated herein in their entirety by reference.

Additionally, U.S. patent application Ser. No. 11/853,194, filed Sep. 11, 2007, for Particle Blast System With Synchronized Feeder and Particle Generator; U.S. Patent Provisional Application Ser. No. 61/589,551 filed Jan. 23, 2012, for Method And Apparatus For Sizing Carbon Dioxide Particles; U.S. Patent Provisional Application Ser. No. 61/592,313 filed Jan. 30, 2012, for Method And Apparatus For Dispensing Carbon Dioxide Particles; U.S. patent application Ser. No. 13/475,454, filed May 18, 2012, for Method And Apparatus For Forming Carbon Dioxide Pellets; U.S. patent application Ser. No. 14/062,118 filed Oct. 24, 2013 for Apparatus Including At Least An Impeller Or Diverter And For Dispensing Carbon Dioxide Particles And Method Of Use; U.S. patent application Ser. No. 14/516,125, filed Oct. 16, 2014, for Method And Apparatus For Forming Solid Carbon Dioxide; U.S. patent application Ser. No. 15/062,842 filed Mar. 7, 2015, for Particle Feeder; U.S. patent application Ser. No. 14/849,819, filed Sep. 10, 2015, for Apparatus And Method For High Flow Particle Blasting Without Particle Storage; and U.S. patent application Ser. No. 15/297,967, filed Oct. 19, 2016, for Blast Media Comminutor, are all incorporated herein in their entirety by reference.

U.S. Pat. No. 5,520,572 illustrates a particle blast apparatus that includes a particle generator that produces small particles by shaving them from a carbon dioxide block and entrains the carbon dioxide granules in a transport gas flow without storage of the granules. U.S. Pat. Nos. 5,520,572, 6,824,450 and US Patent Publication No. 2009-0093196 disclose particle blast apparatuses that include a particle generator that produces small particles by shaving them from a carbon dioxide block, a particle feeder which receives the particles from the particle generator and entrains them which are then delivered to a particle feeder which causes the particles to be entrained in a moving flow of transport gas. The entrained flow of particles flows through a delivery hose to a blast nozzle for an ultimate use, such as being directed against a workpiece or other target.

For some blasting applications, it may be desirable to have a range of small particles, such as in the size range of 3 mm diameter to 0.3 mm diameter. US Patent Publication 2017-0106500 (corresponding to U.S. patent application Ser. No. 15/297,967) discloses a comminutor which reduces the size of particles of frangible blast media from each particle's respective initial size to a second size which is small than a desired maximum size.

BRIEF DESCRIPTION OF THE DRAWINGS

The accompanying drawings illustrate embodiments which serve to explain the principles of the present innovation.

DETAILED DESCRIPTION

Figure 1:
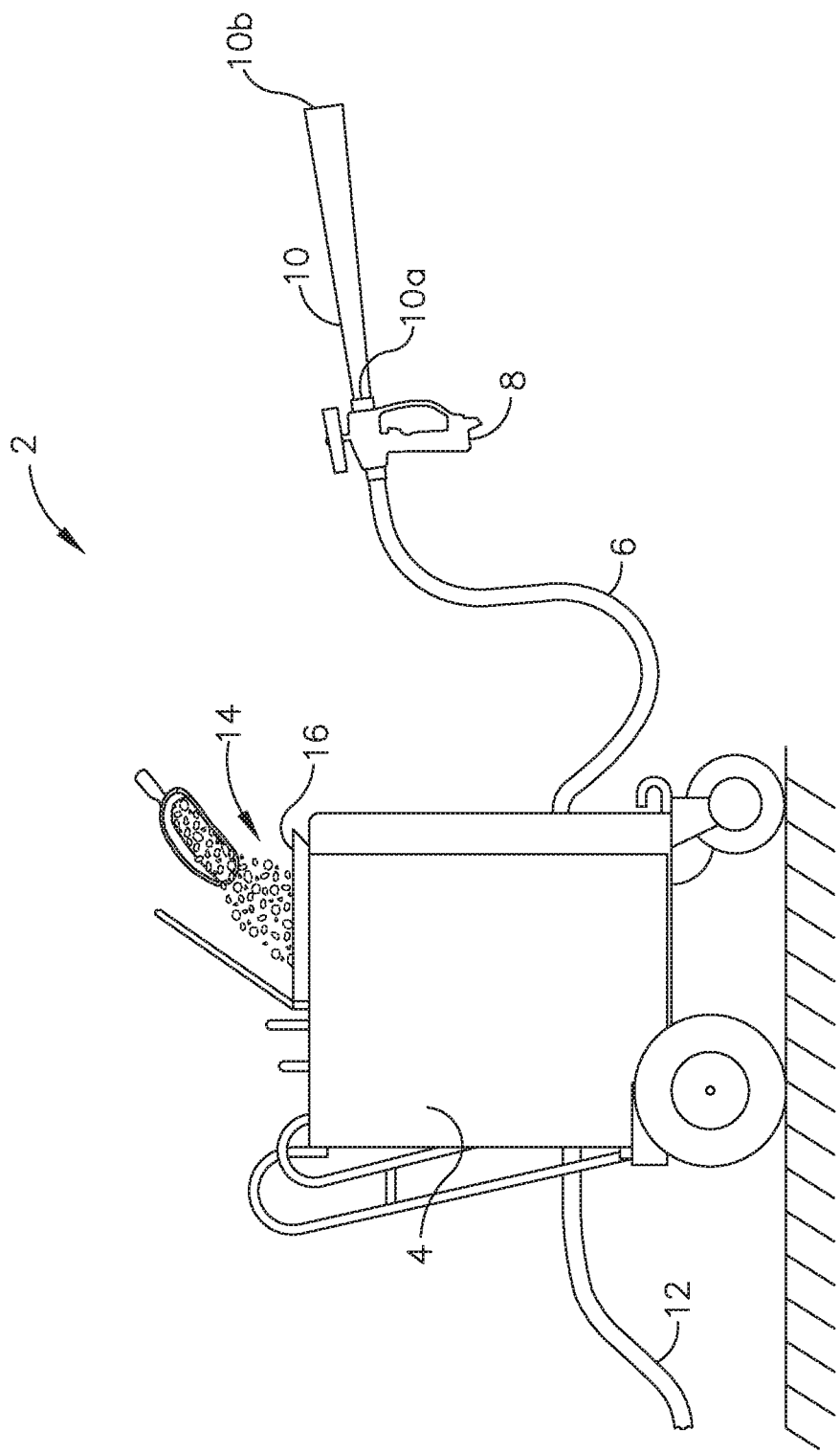
FIG. 1 diagrammatically illustrates a particle blast apparatus.

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations. Referring in more detail to the drawings, one or more embodiments constructed according to the teachings of the present innovation are described.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference.

Although this patent refers specifically to carbon dioxide, the invention is not limited to carbon dioxide but rather may be utilized with any suitable frangible material as well as any suitable cryogenic material or other type of particle such as water ice pellets or abrasive media. References herein to carbon dioxide, at least when describing embodiments which serve to explain the principles of the present innovation are necessarily limited to carbon dioxide but are to be read to include any suitable frangible or cryogenic material.

Referring to FIG. 1, there is shown a representation of a particle blast apparatus, generally indicated at 2, which includes cart 4, delivery hose 6, hand control 8, and discharge nozzle 10. Internal to cart 4 is a blast media delivery assembly (not shown in FIG. 1) which includes a hopper and a feeder assembly disposed to receive particles from the hopper and to entrain particles into a flow of transport gas. Particle blast apparatus 2 is connectable to a source of transport gas, which may be delivered in the embodiment depicted by hose 12 which delivers a flow of air at a suitable pressure, such as but not limited to 80 PSIG. Blast media, such as but not limited to carbon dioxide particles, indicated at 14, may be deposited into the hopper through top 16 of the hopper. The carbon dioxide particles may be of any suitable size, such as but not limited to a diameter of 3 mm and a length of about 3 mm. The feeder assembly entrains the particles into the transport gas, which thereafter flow at a subsonic speed through the internal flow passageway defined by delivery hose 6. Delivery hose 6 is depicted as a flexible hose, but any suitable structure may be used to convey the particles entrained in the transport gas. Hand control 8 allows the operator to control the operation of particle blast apparatus 2 and the flow of entrained particles. Downstream of control 8, the entrained particles flow into entrance 10a of discharge nozzle 10. The particles flow from exit 10b of discharge nozzle 10 and may be directed in the desired direction and/or at a desired target, such as a work piece (not shown).

Discharge nozzle 10 may be of any suitable configuration, for example, discharge nozzle 10 may be a supersonic nozzle, a subsonic nozzle, or any other suitable structure configured to advance or deliver the blast media to the desired point of use.

Control 8 may be omitted and the operation of the system controlled through controls on cart 4 or other suitable location. For example, the discharge nozzle 10 may be mounted to a robotic arm and control of the nozzle orientation and flow accomplished through controls located remote to cart 4.

Figure 2:
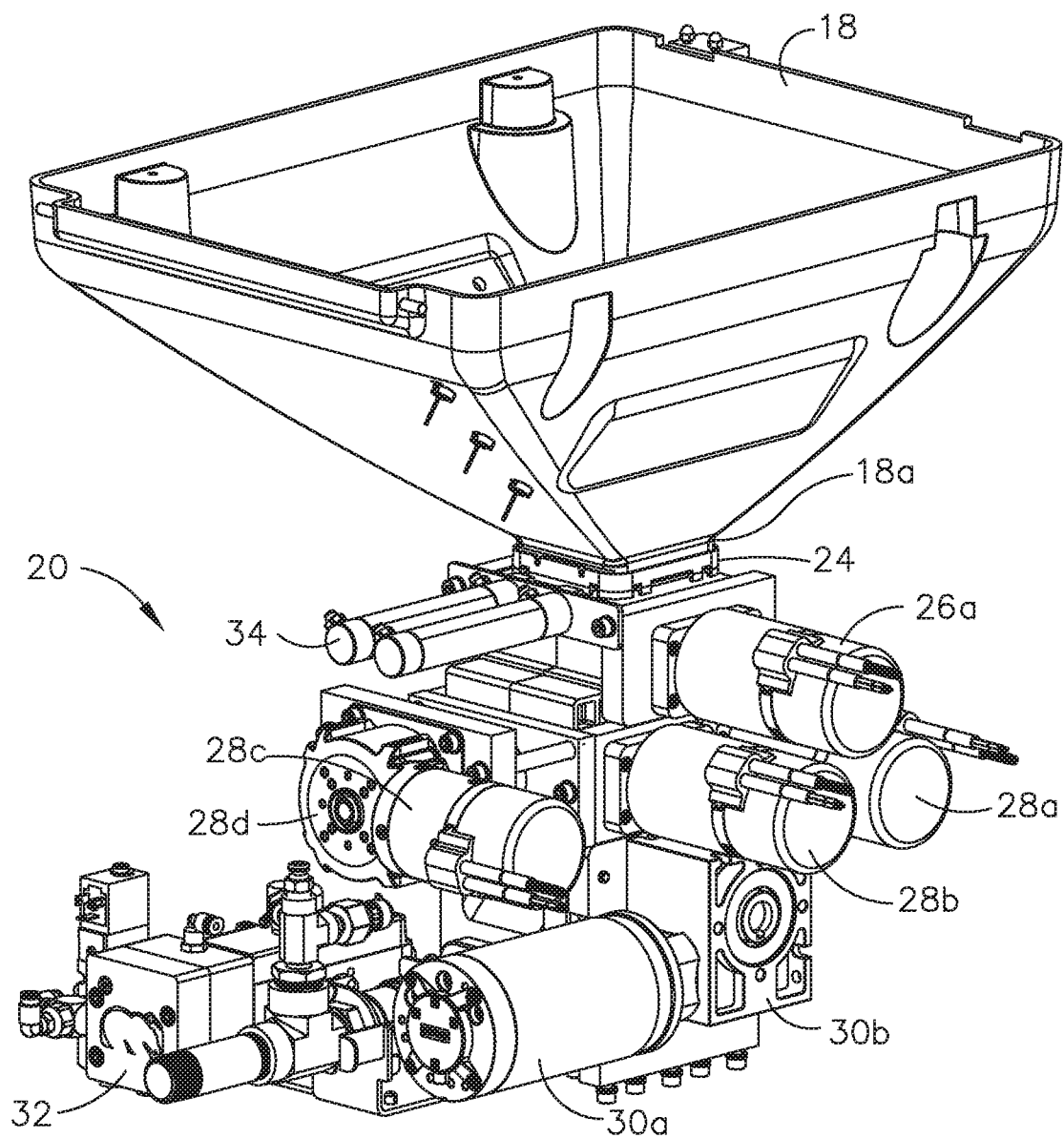
FIG. 2 is a perspective view of a hopper, feeder assembly and pressure regulator that may be carried by the particle blast apparatus of FIG. 1.
Figure 3:
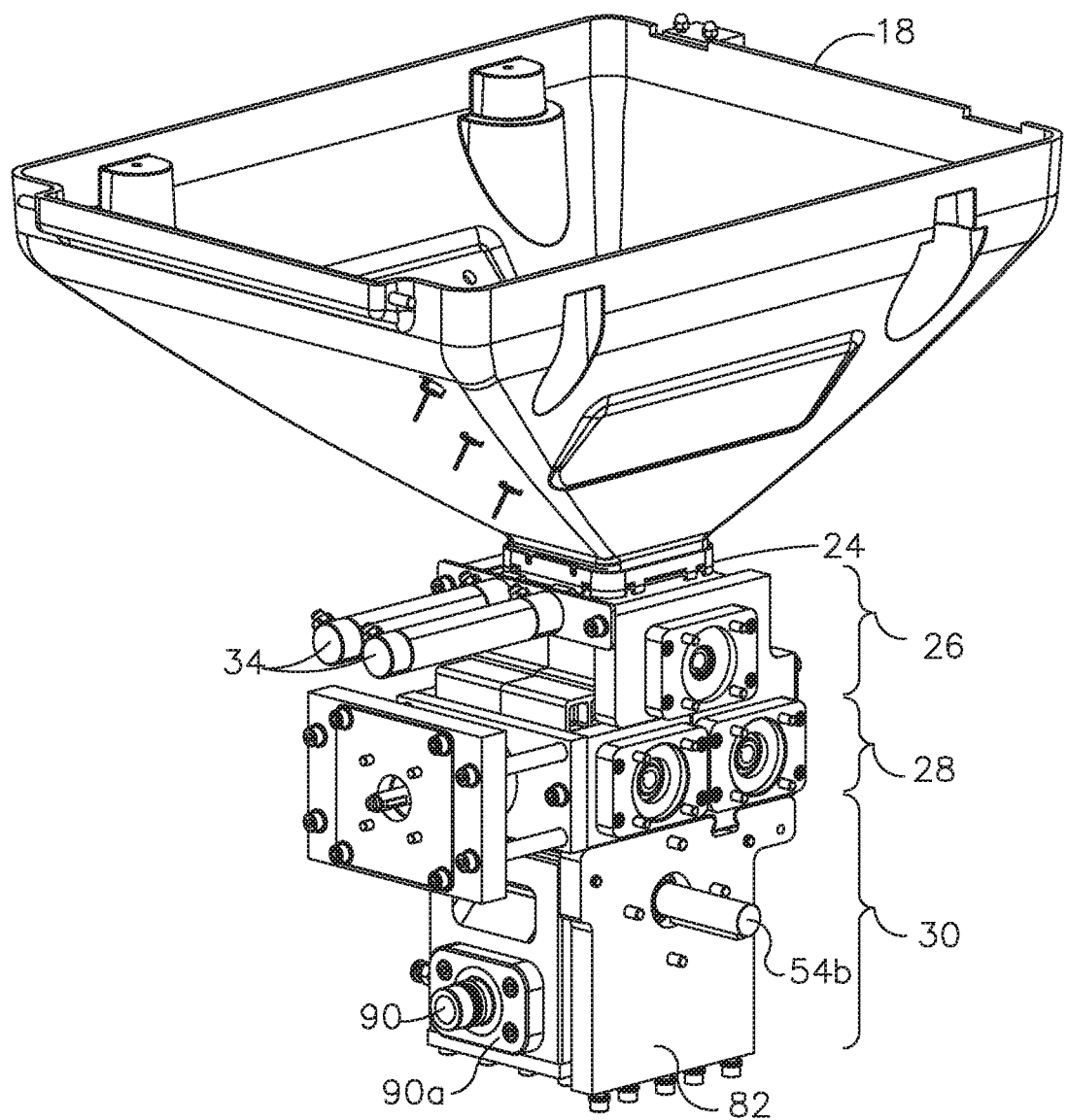
FIG. 3 is perspective view of the hopper and feeder assembly of FIG. 2, with drives and pressure regulator omitted for clarity.

Referring to FIGS. 2 and 3, there is shown hopper 18 and feeder assembly 20 of particle blast apparatus 2. Hopper 18 may include a device (not shown) for imparting energy to hopper 18 to aid in the flow of particles therethrough. Hopper 18 is a source of blast media, such as cryogenic particles, for example but not limited to carbon dioxide particles. Hopper exit 18a is aligned with guide 22 (see FIG. 4), at hopper seal 24. Any suitable source of blast media may be used, such as without limitation, a pelletizer.

Feeder assembly 20 is configured to transport blast media from a source of blast media into a flow of transport gas, with the blast media particle being entrained in the transport gas as the flow leaves feeder assembly 20 and enters delivery hose 6. In the embodiment depicted, feeder assembly 20 includes metering portion 26, comminutor 28 and feeding portion 30. As discussed below, comminutor 28 may be omitted from feeder assembly 20 (with metering portion 26 discharging directly to feeding portion 30), metering portion 28 may be omitted from feeder assembly 20 (with comminutor receiving particles directly from a source of blast media such as hopper 18), and feeding portion 30 may be of any construction which entrains particles into the transport gas whether a single hose, multiple hose and/or venturi type system. The pressure and flow of transport gas delivered to feeding portion 30 is controlled by pressure regulator assembly 32.

Feeder assembly 20 includes a plurality of motors to drive its different portions. These motors may be of any suitable configuration, such as pneumatic motors and electric motors, including without limited to, DC motors and VFD. Metering portion 26 includes drive 26a, which, in the embodiment depicted, provides rotary power. In the embodiment depicted, comminutor 28 includes three drives, 28a and 28b, which provide rotary power, and 28c, which provides rotary power through right angle drive 28d. In the embodiment depicted, feeding portion 30 includes drive 30a, which provides rotary power through right angle drive 30b. Any suitable quantity, configuration and orientation of drives, with or without the presence of right angle drives, may be used. For example, fewer motors may be used with appropriate mechanisms to transmit power to the components at the appropriate speeds (such as chains, belts, gears, etc.). As can be seen in FIG. 3, with the drives and right angle drives removed, locating pins may be used to locate the drives.

Feeder assembly 20 may include one or more actuators 34, each having at least one extendable member (not illustrated), disposed to be selectively extended into the particle flow from hopper 18 to feeder assembly 20 at guide 22, capable of mechanically breaking up clumps of particles, as such is described in U.S. Pat. No. 6,524,172.

Figure 4:
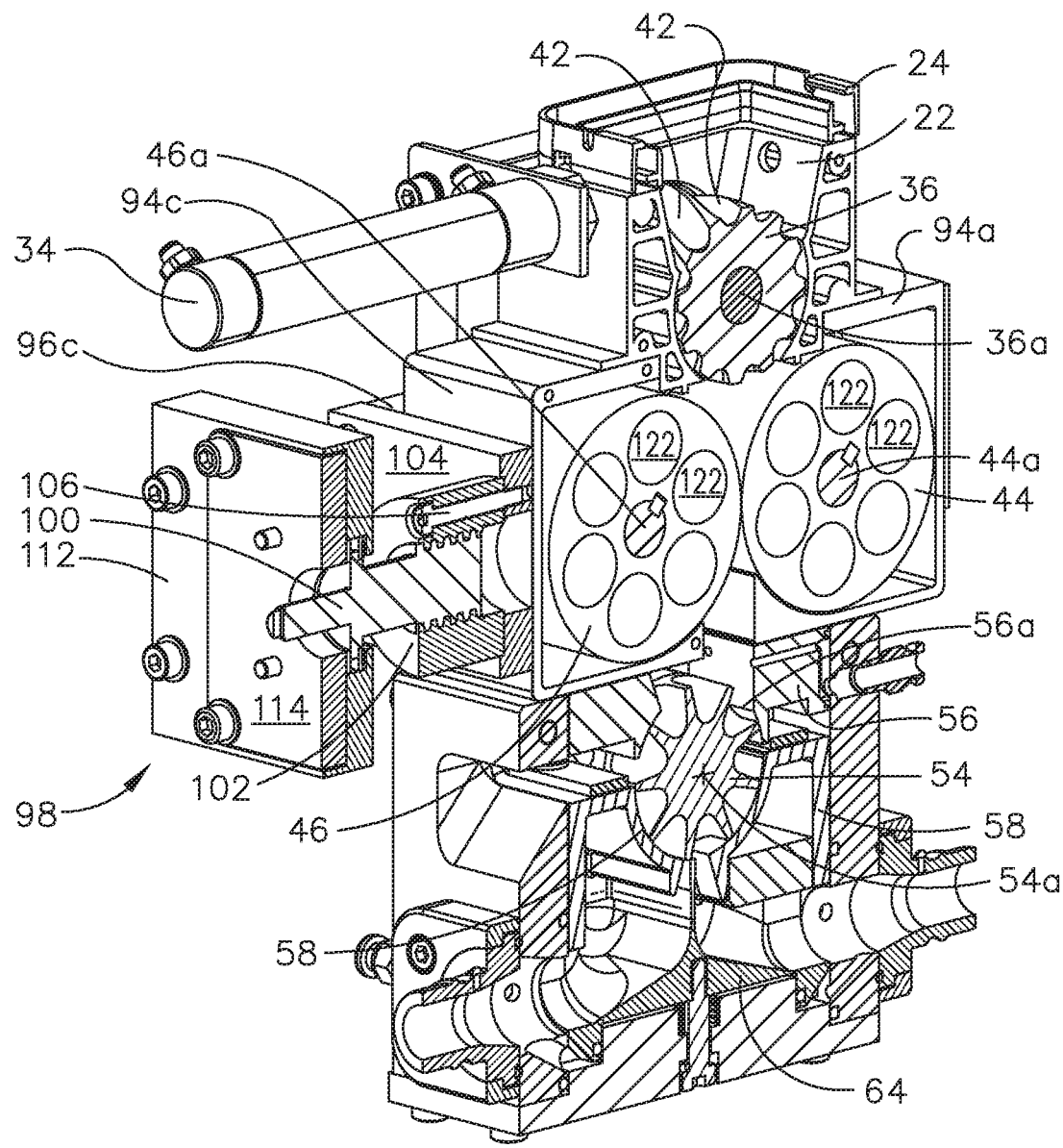
FIG. 4 is a cross-sectional perspective view of the feeder assembly of FIG. 3 taken through a vertical plane passing through the midline of the feeder assembly.
Figure 5A:
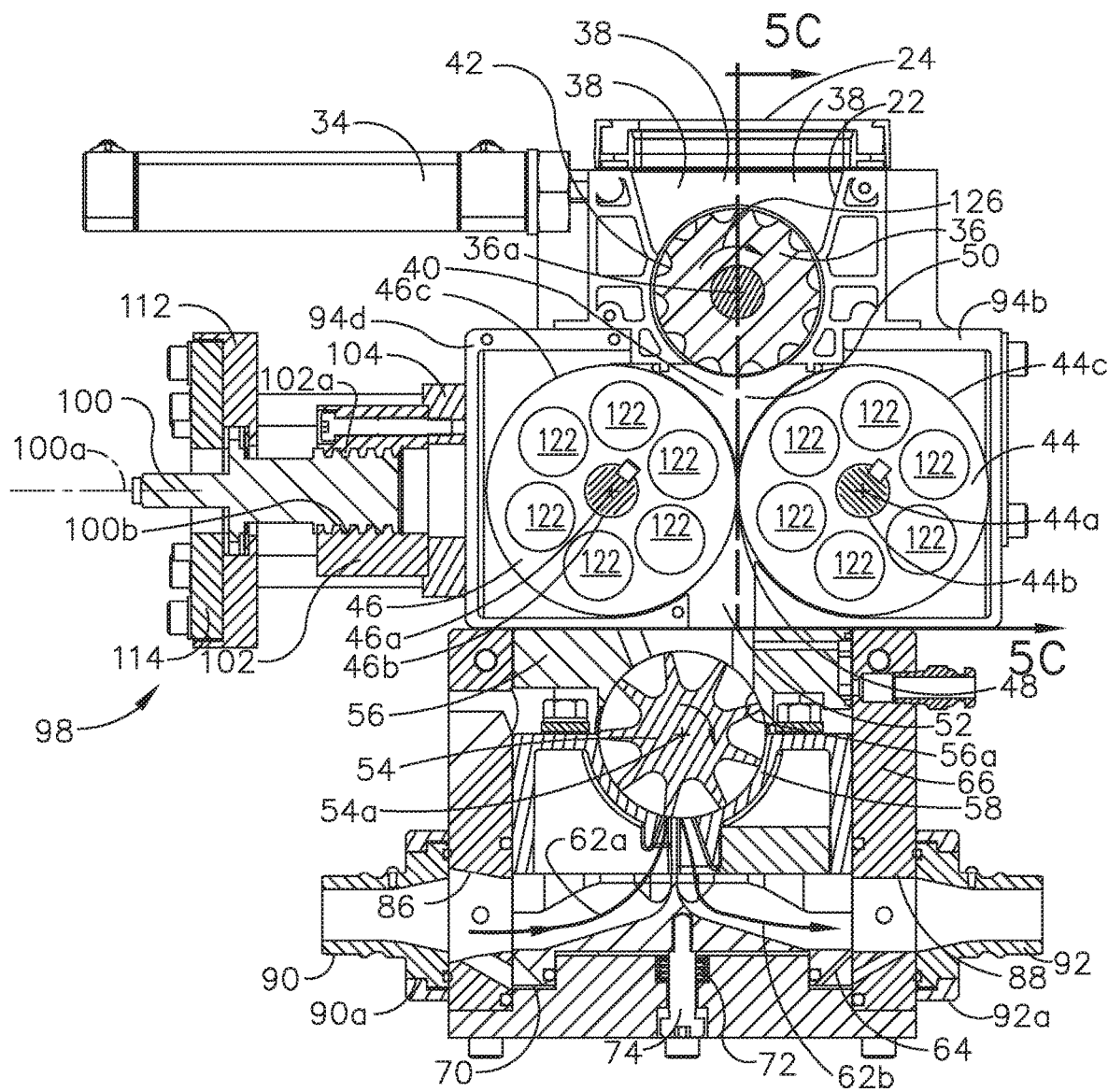
FIG. 5A is a cross-sectional side view of the feeder assembly of FIG. 4 taken at the same vertical plane as in FIG. 4.
Figure 5B:
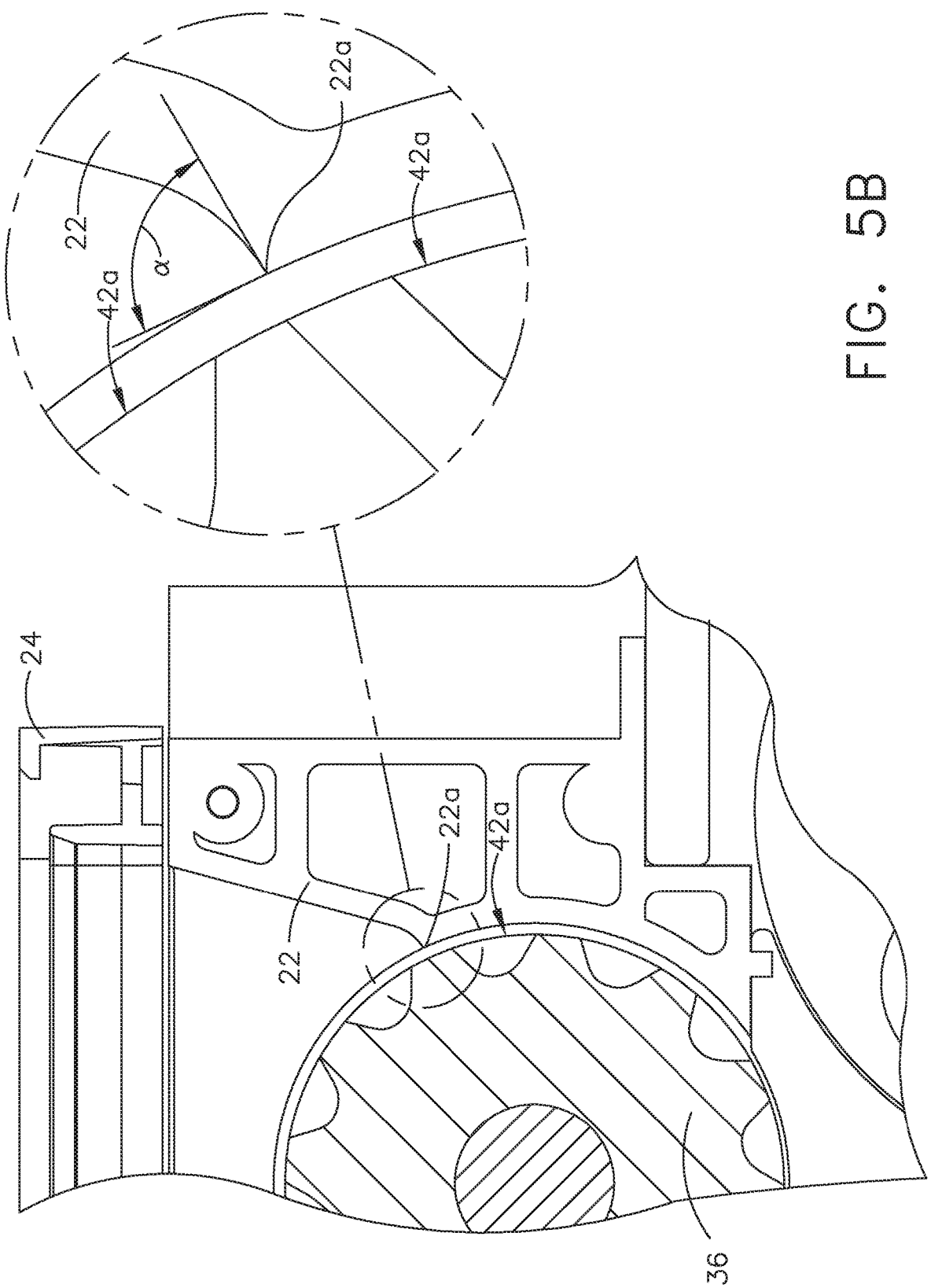
FIG. 5B is an enlarged fragmentary cross-sectional side view of the metering element and guide.
Figure 5C:
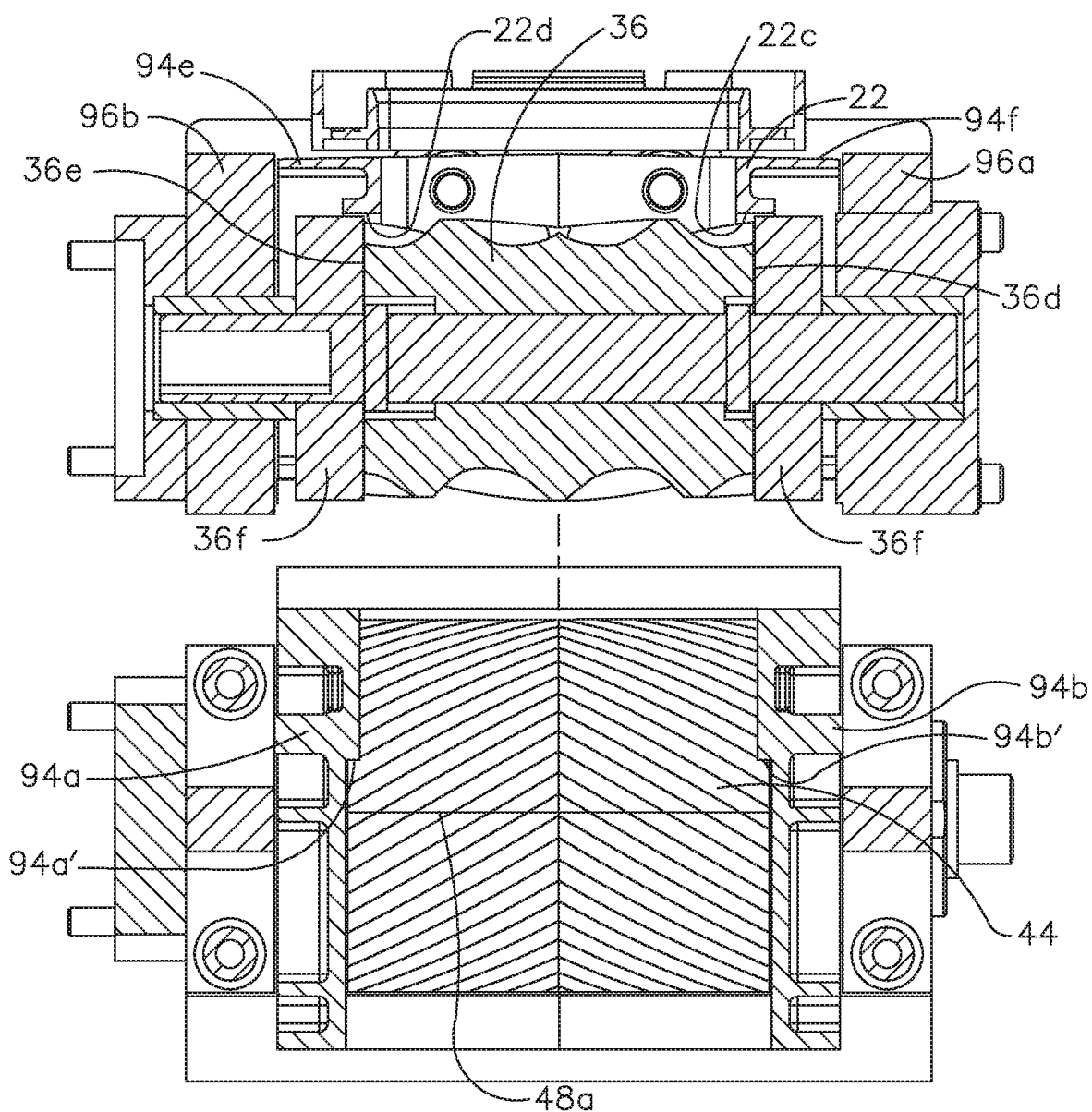
FIG. 5C is a cross sectional view taken along line 5C-5C of FIG. 5A.

Referring also to FIGS. 4 and 5A, metering portion 26 includes guide 22 and metering element 36. Metering element 36 is configured to receive blast media from hopper 18, a source of blast media (in the embodiment depicted, cryogenic particles) from first region 38 and to discharge blast media at second region 40. Guide 22 may be made of any suitable material, such as aluminum, stainless steel, or plastic. Guide 22 is configured to guide blast media from hopper 18 to first region 38. Guide 22 may have any configuration suitable to guide blast media from hopper 18 to first region 38, such as without limitation converging walls. Metering element 36 is configured to control the flow rate of blast media for particle blast apparatus 2. The rate may be expressed using any nomenclature, such as mass (or weight) or volume per unit time, such as pounds per minute. Metering element 36 may be configured in any way suitable to control the blast media flow rate. In the embodiment depicted, metering element 36 is configured as a rotor—a structure which is rotatable about an axis, such as axis 36a. In the embodiment depicted, metering element 36 is supported by shaft 36b, with a key/keyway arrangement preventing rotation between metering element 36 and shaft 36b. Drive 26a is coupled to shaft 36b and may be controlled to rotate shaft 36b about axis 36a, thereby rotating metering element 36 about axis 36a. Metering element 36 will also be referred to herein as rotor 36, metering rotor 36 or even doser 36, it being understood that references to metering element 36 as a rotor or a doser shall not be interpreted in a manner which limits metering element to the rotor structure illustrated. As a non-limiting example, metering element 36 may be a reciprocating structure. Metering rotor 36, as depicted, includes a plurality of cavities 42, which are also referred to herein as pockets 42. Pockets 42 may be of any size, shape, number or configuration. In the embodiment depicted, pockets 42 open radially outwardly and extend between the ends of metering rotor 36, as described below. Rotation of metering rotor 36 cyclically disposes each pocket 42 at a first position adjacent first region 38 to receive particles and a second position adjacent second region 40 to discharge particles.

Comminutor 28 includes roller 44 which is rotatable about an axis, such as axis 44a and roller 46 which is rotatable about an axis, such as axis 46a. In the embodiment depicted, roller 44 is supported by shaft 44b, with a key/keyway arrangement preventing rotation between roller 44 and shaft 44b. Drive 28a is coupled to shaft 44b and may be controlled to rotate shaft 44b about axis 44a, thereby rotating roller 44 about axis 44a. In the embodiment depicted, roller 46 is supported by shaft 46b, with a key/keyway arrangement preventing rotation between roller 46 and shaft 46b. Drive 28b is coupled to shaft 46b and may be controlled to rotate shaft 46b about axis 46a, thereby rotating roller 46 about axis 46a. Rollers 44, 46 may be made of any suitable material, such as aluminum.

Rollers 44 and 46 have respective peripheral surfaces 44c, 46c. Gap 48 is defined between each respective peripheral surface 44c, 46c. Converging region 50 is defined upstream of gap 48 by gap 48 and rollers 44, 46. (Downstream is the direction of flow of blast media through feeder assembly 20, and upstream is the opposite direction.) Converging region 50 is disposed to receive blast media from second region 40 which has been discharged by rotor 26. Diverging region 52 is defined downstream of gap 48 by gap 48 and rollers 44, 46.

Comminutor 28 is configured to receive blast media, which comprises a plurality of particles (carbon dioxide particles in the embodiment depicted) from metering element 26 and to selectively reduce the size of the particles from the particles' respective initial sizes to a second size which is smaller than a predetermined size. In the embodiment depicted, comminutor 28 receives blast media from metering portion 26/metering element 36. In an alternative embodiment, metering portion 26/metering element 36 may be omitted and comminutor 28 may receive blast media from any structure, including directly from a source of blast media. As is known, rollers 44, 46 are rotated to move peripheral surfaces 44c, 46c in the downstream direction at gap 48, the terminus of converging region 50. As blast media particles travel in the downstream direction through gap 48, the sizes of particles which are initially larger than the width of gap 48 between peripheral surfaces 44c, 46c will be reduced to a size based on the gap size.

The size of gap 48 may be varied between a minimum gap and a maximum gap. The maximum gap and minimum gap may be any suitable size. The maximum gap may be large enough that none of the particles traveling through gap 48 undergo a size change. The minimum gap may be small enough that all of the particles traveling through gap 48 undergo a size change. Depending on the maximum gap size, there may be a gap size, which is less than the maximum gap size, at which comminution of particles first begins. At gap sizes at which less than all of the particles traveling through gap 48 are comminuted, comminutor 28 reduces the size of a plurality of the plurality of particles. In the embodiment depicted, the minimum gap is configured to comminute particles to a very fine size, such as 0.012 inches, which may be referred to in the standard industry as microparticles, with the minimum gap being 0.006 inches. In the embodiment depicted, the maximum gap is configured to not comminute any particles, with the maximum gap being 0.7 inches. Any suitable minimum and maximum gap may be used.

Figure 6:
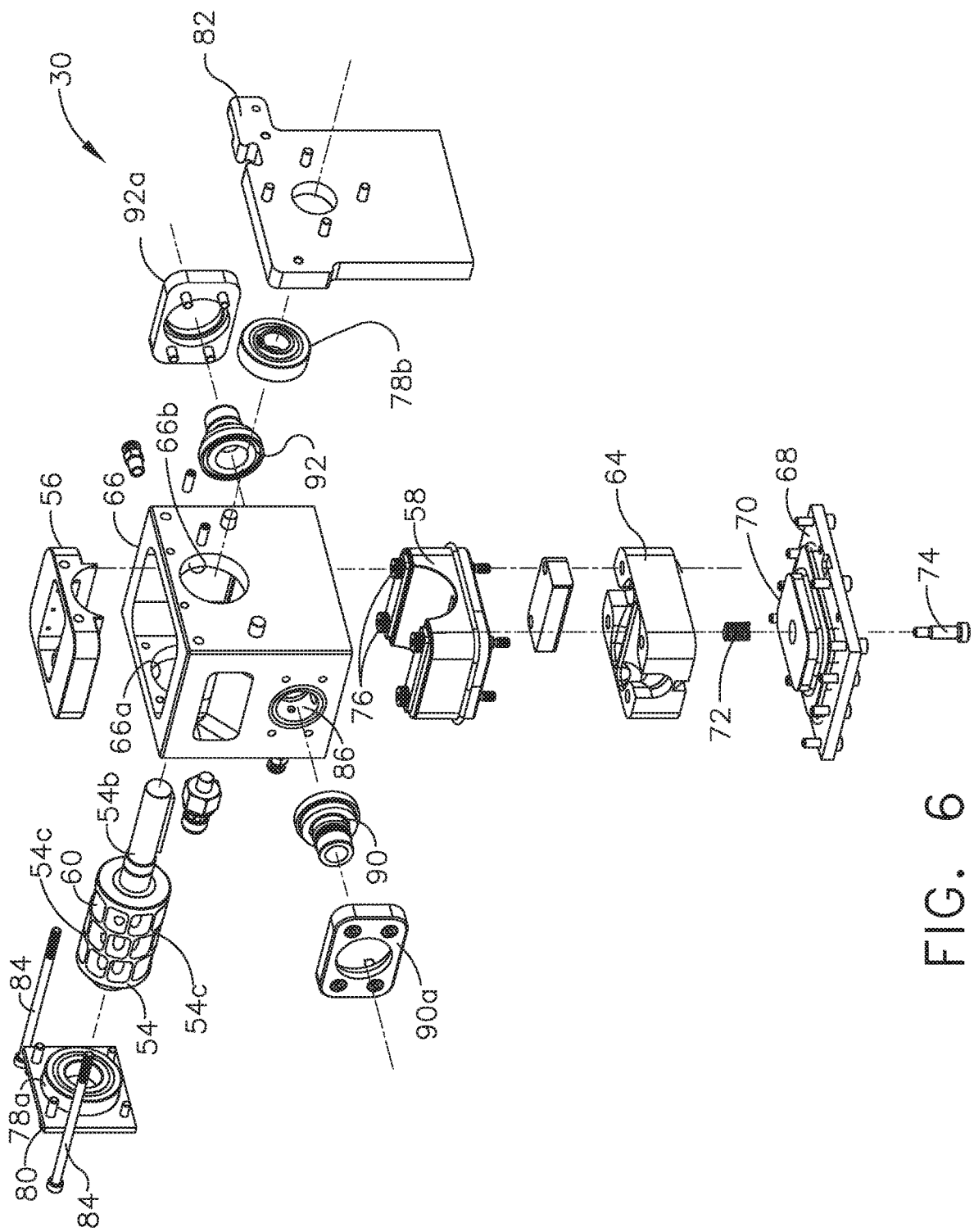
FIG. 6 is an exploded perspective view of the feeding portion of the feeder assembly.
Figure 7:
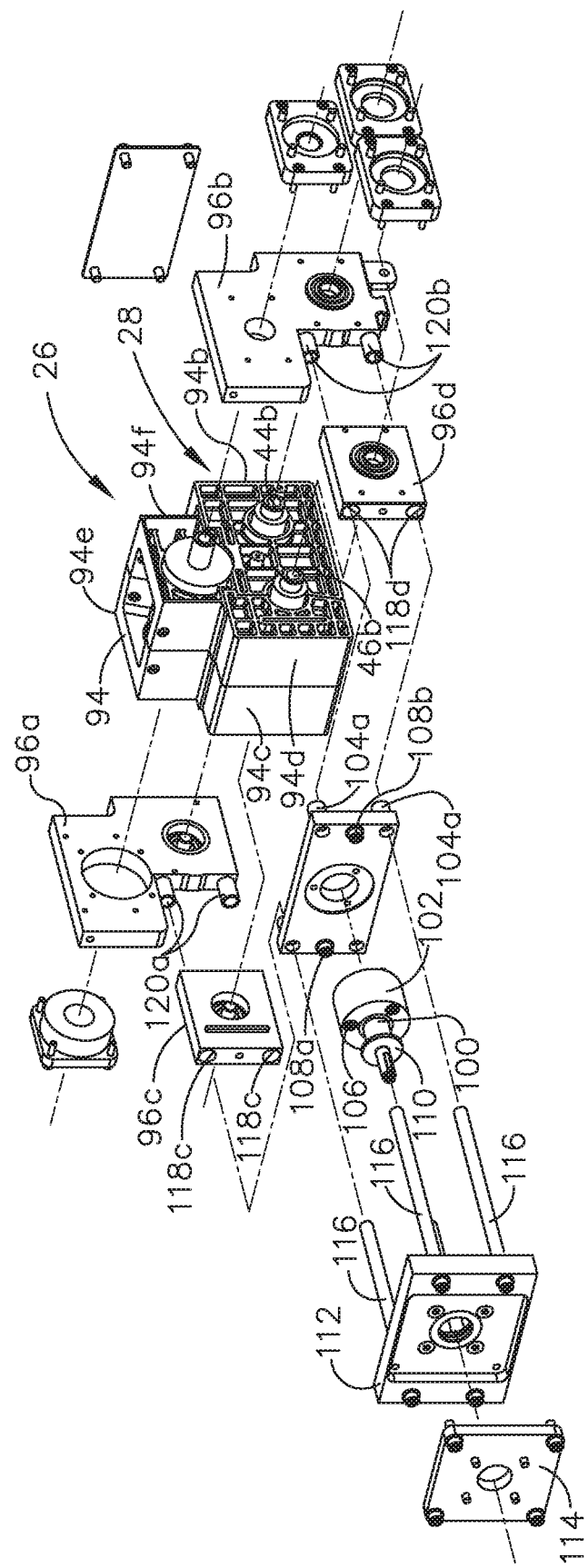
FIG. 7 is an exploded perspective view of the metering portion and the comminutor of the feeder assembly.

Feeding portion 30 may be of any design which is configured to receive blast media particles and introduce the particles into the flow of transport gas, entraining them in the flow. In the embodiment depicted, feeding portion 30 includes feeding rotor 54, guide 56 disposed between gap 48 and feeding rotor 54, and lower seal 58. Feeding rotor 54 is rotatable about an axis, such as axis 54a. In the embodiment depicted, shaft 54b (see FIG. 6) is integral with feeding rotor 54, and may be of unitary construction. Alternately, shaft 54b may be a separate shaft which carries feeding rotor 54 so that feeding rotor 54 does not rotate with respect to shaft 54b. Feeding rotor 54 may be made of any suitable material, such as stainless steel.

As illustrated, drive 30a is coupled to shaft 54b, through right angle drive 30b, and may be controlled to rotate shaft 54b and, concomitantly, feeding rotor 54 about axis 54a.

Feeding rotor 54 comprises peripheral surface 54c (see FIG. 6), also referred to herein as circumferential surface 54c, which has a plurality of pockets 60 disposed therein. Each pocket 60 has a respective circumferential width. Guide 56 is configured to receive particles from comminutor 28 and guide the particles into pockets 60 as feeding rotor 54 is rotated about axis 54a. As mentioned above, in one embodiment, comminutor 28 may be omitted from feeder assembly 20 with guide 56 receiving particles directly from metering element 36. Guide 56 includes wiping edge 56a adjacent peripheral surface 54c and extending longitudinally, generally parallel to axis 54a. Feeding rotor 54 rotates in the direction indicated by the arrow such that wiping edge 56a defines a nip line for feeding rotor 54 and functions, with the rotation of feeding rotor 54, to force particles into pockets 60.

Lower seal 58 seals against peripheral surface 54c. Lower seal 58 may be of any suitable configuration.

Feeding portion 30 defines transport gas flow path 62 indicated by flow lines 62*a* and 62*b* through which transport gas flows during operation of particle blast apparatus 2. Transport gas flow path 62 is connectable to a source of transport gas, either directly or through pressure regulator assembly 32 (described below), with the appropriate fittings external to feeding portion 30. Transport gas flow path 62 may be defined by any suitable structure and configured in any suitable way which allows the entrainment of particles discharged from pockets 60 into the transport gas. In the embodiment depicted, lower seal 58 and piston 64 define at least a portion of transport gas flow path 62, with part of flow path 62 being through pockets 60, as described in U.S. patent application Ser. No. 15/297,967.

Rotation of feeding rotor 54 introduces particles into the flow of transport gas, entraining them in the flow. The entrained flow (particles and transport gas) flow through delivery hose 6 and out discharge nozzle 10. Thus, there is a particle flow path extending between the source of blast media to the discharge nozzle, which, in the embodiment depicted, extends through metering portion 26, comminutor 28 and feeding portion 30.

Referring to FIG. 5B, there is shown an enlarged fragmentary cross-sectional view of metering rotor 36 and guide 22. Guide 22 includes wiping edge 22*a* disposed adjacent outer peripheral surfaces 36*c* of metering rotor 36. Outer peripheral surfaces 36*c* travel past wiping edge 22*a* as metering rotor 36 is rotated. Wiping edge 22*a* is configured to wipe across opening 42*a* of each pocket 42 as metering rotor 36 is rotated. Wiping edge 22*a* is disposed at wiping angle α relative to a tangent to metering rotor 36, with an arcuate section transitioning from the sloped sides of guide 22 to wiping edge 22*a*. In the embodiment depicted, this arcuate transition section has a radius of 0.29 inches, although any suitable radius or transition shape may be used. As used herein, wiping angle is the angle formed between the wiping edge and a tangent to metering rotor as illustrated measured in FIG. 5B. Wiping angle α is configured to not result in a nip line between wiping edge 22*a* and outer peripheral surfaces 36*c* as metering rotor 36 is rotated in the direction indicated. If a nip line is present at this location, particles could be forced and/or crushed into pockets 42, which for carbon dioxide particles, results in the particles tending not to fall out of the pocket at discharge. In the embodiment depicted, wiping angle α is greater than 90°.

FIG. 5C illustrates the overhang of entrance 22 relative to metering rotor 36, the overhang of housing 94 relative to roller 44, and that roller 44 (and correspondingly roller 46) is wider than metering rotor 36. As shown, surface 22*c* of entrance 22 axially overhangs first end 36*d* of metering rotor 36 and surface 22*d* of entrance 22 axially overhangs second end 36*e*. The upper portions of both ends 36*d*, 36*e* are disposed in recesses, defined by surfaces 22*c*, 22*d* in housings 94*f*, 94*e* respectively. With this construction, particles traveling through guide 22 are blocked from reaching ends 36*d*, 36*e*. Similarly, surfaces 94*a*' and 94*b*' overhang the ends of roller 44 (and concomitantly the ends of roller 46, not seen in FIG. 5C). The upper portions of both ends of rollers 44, 46 are disposed in recesses. As can be seen in FIG. 5C, roller 44 (and concomitantly roller 46) is wider than metering rotor 36. This construction avoids ledges where ice could build up.

Referring to FIG. 6, an exploded perspective view of feeding portion 30 is depicted. In addition to the above description, in the embodiment depicted, feeding portion 30 includes housing 66 and base 68. Base includes centrally disposed raised portion 70. Similar to as described in U.S. patent application Ser. No. 15/062,842, an internal cavity of piston 64 sealingly engages raised portion 70, forming a chamber which is in fluid communication with the transport gas. Spring 72 is disposed to urge piston upwardly, with pilot 74 engaging piston 64 as seen in FIG. 5A. In the embodiment depicted, lower seal 58 is secured to piston 64 by fasteners 76 with appropriate seals.

Housing 66 includes bores 66*a*, 66*b* which receive bearings 78*a*, 78*b*. Bearings 78*a*, 78*b* rotatably support feeding rotor 54. Bearing 78*a* is retained in bore 66*a* by retainer 80 which is secured to housing 66. Bearing 78*b* is retained in bore 66*b* by retainer/support 82, which is secured to housing by fasteners 84. Right angle drive 30*b* may be attached to retainer/support 82. Housing 66 may be made of any suitable material, such as aluminum.

Inlet 86 and outlet 88 (see FIG. 5A) of transport gas flow path 62 are formed in housing 66 as shown. Fittings 90, 92 sealing engage housing 66 at inlet 86 and outlet 88, respectively, with retainers 90*a*, 92*a* securing them thereto.

Referring to FIGS. 7 and 8, there are illustrated exploded perspective views of metering portion 26 and comminutor 28. In the depicted embodiment, housing 94 houses metering rotor 36 and rollers 44, 46. Shaft 36*b* may be rotationally supported by bearings 36*f* Housing 94 may be made of any suitable material, such as aluminum, and of any suitable configuration. In the embodiment depicted, housing 94 comprises six parts. As illustrated, housings 94*a* and 94*b* carry roller 44, while housing 94*c* and 94*d* carry roller 46. Housings 94*e* and 94*f* carry metering rotor 36.

Housings 94*c* and 94*d* are moveable relative to housings 94*a* and 94*b* so as to vary the width of gap 48. Housings 94*a*, 94*b*, 94*c* and 94*d* have corresponding supports 96*a*, 96*b*, 96*c* and 96*d*. Supports 96*a*, 96*b* rotatably support shafts 36*b* and 44*b*, and supports 96*c*, 96*d* rotatably support shaft 46*b*. Supports 96*a*, 96*b*, 96*c* and 96*d* may be made of any suitable material, such as aluminum. Housings 94*a*, 94*b* and supports 96*a*, 96*b* are depicted as not being moveable relative to feeding portion 30 and hopper 18.

Referring also to FIGS. 4 and 5A, feeder assembly 20 includes gap adjustment mechanism 98 which is connected to supports 96*c*, 96*d* to move and dispose them at a plurality of positions, including a first position at which gap 48 is at its minimum and a second position at which gap 48 is at its maximum. Gap adjustment mechanism 98 comprises shaft 100 which is rotatable about an axis, such as axis 100*a*, and external teeth or threads 100*b* disposed extending longitudinally as illustrated. Drive 28*c* is coupled to shaft 100 through right angle drive 28*d* and may be controlled to rotate shaft 100. Gap adjustment mechanism 98 comprises member 102 gear with internal teeth or threads 102*a* disposed about axis 100*a*, which are shaped complementarily with external teeth or threads 100*b*, engaging therewith. Rotation of shaft 100 causes relative longitudinal motion between shaft 100 and member 102.

Member 102 is secured to plate 104 by a plurality of fasteners 106. Plate 104 is secured to support 96*c* by fastener 108*a* and to support 96*d* by fastener 108*b*.

Shaft 100 includes flange 110 which is captured between support 112 and retainer 114, allowing rotational motion about axis 100*a* with little or no axial motion. A plurality of rods 116 secure support 112 to supports 96*a*, 96*b*, with no movement therebetween. Rods 116 support plate 104 so that it can move axially along rods 116. Plate 104 includes a plurality of guides 104*a* which are disposed in complementarily shaped bores 118*c*, 118*d*. Since plate 104 is secured to supports 96*c*, 96*d* by fasteners 108*a*, 108*b*, there is no relative movement between guides 104a and supports 96c, 96d. Guides 104a are sized to allow rods 116 to slide axially therein.

Supports 96a, 96b include guides 120a, 120b respectively which are disposed in complementarily shaped bores (not seen) in supports 96c, 96d. These bores are sized to allow guides 120a, 120b to slide axially therein. Guides 120a, 120b support and guide supports 96c, 96d at and between the first and second positions of their travel. Rods 116 extend through guides 104a, bores 118c, 118d, and guides 120a, 120b, being fastened to supports 96a, 96b such that support 112 is supported and does not move relative to supports 96a, 96b.

Rotation of shaft 100 moves plate 104 along axis 100a and concomitantly moves supports 96c, 96d and roller 46 relative to supports 96a, 96b and roller 44, thereby varying the width of gap 48.

Figure 8:
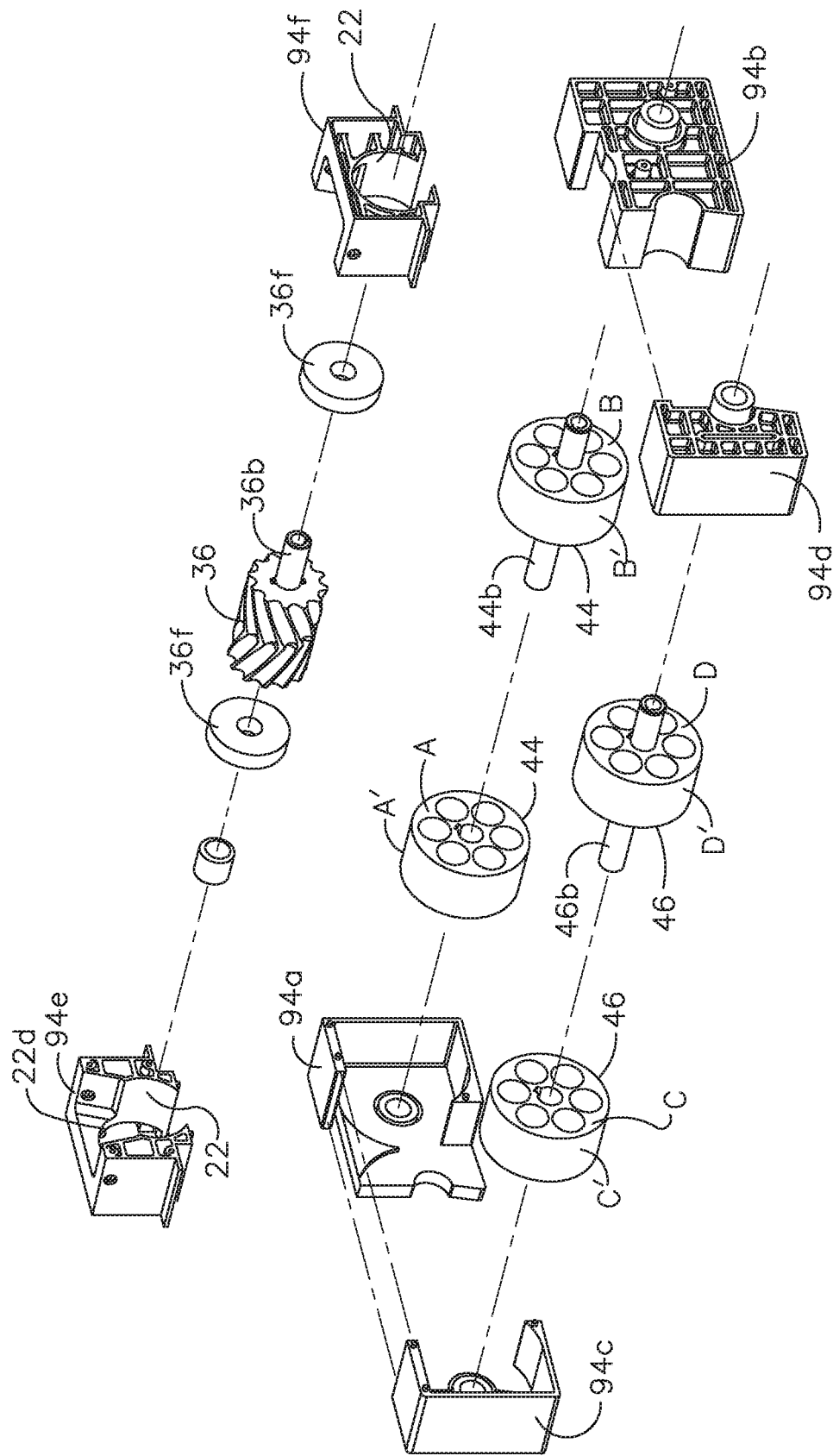
FIG. 8 is an exploded perspective view of the metering portion and the comminutor.

Rollers 44 and 46 may comprise a plurality of rollers. As seen in FIG. 8, roller 44 may comprise sub-rollers rollers A and B non-rotatably carried by shaft 44b and roller 46 may comprise sub-rollers rollers C and D non-rotatably carried by shaft 46b. Each individual sub-roller roller A, B, C, D has a respective peripheral surface A', B', C' and D'.

Rollers 44, 46, regardless whether comprised of single rollers or a plurality of rollers, may include a plurality of bores 122 therethrough. If rollers 44, 46 comprise a plurality of rollers, bores 122 within each roller may be aligned axially. Bores 122 reduce the overall mass of rollers 44, 46. Such reduced mass reduces the time required for a temperature change in rollers 44, 46, such as a reduction in the time required for any ice built up on rollers 44, 46 during operation to melt during periods that particle blast apparatus 2 is not being operated. In another embodiment, air or other gas may be directed to flow through bores 122 to promote a faster temperature change.

Figure 9:
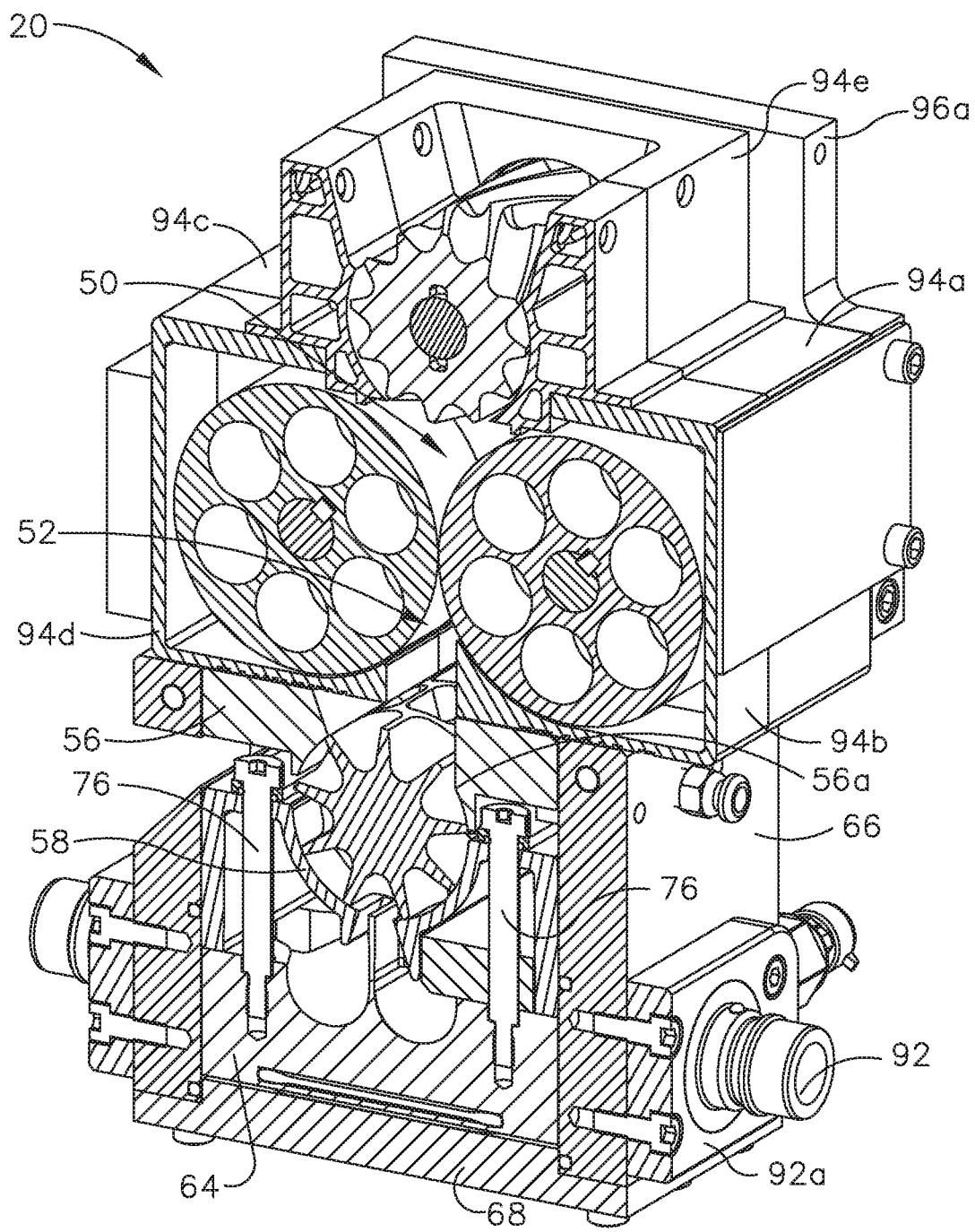
FIG. 9 is a cross-sectional perspective view of the feeder assembly similar to FIG. 4, taken at a different angle and through a different vertical plane, one which does not pass through the midline of the feeder assembly.

For additional clarity, FIG. 9 provides a cross-sectional perspective view of feeder assembly 20.

Figure 10:
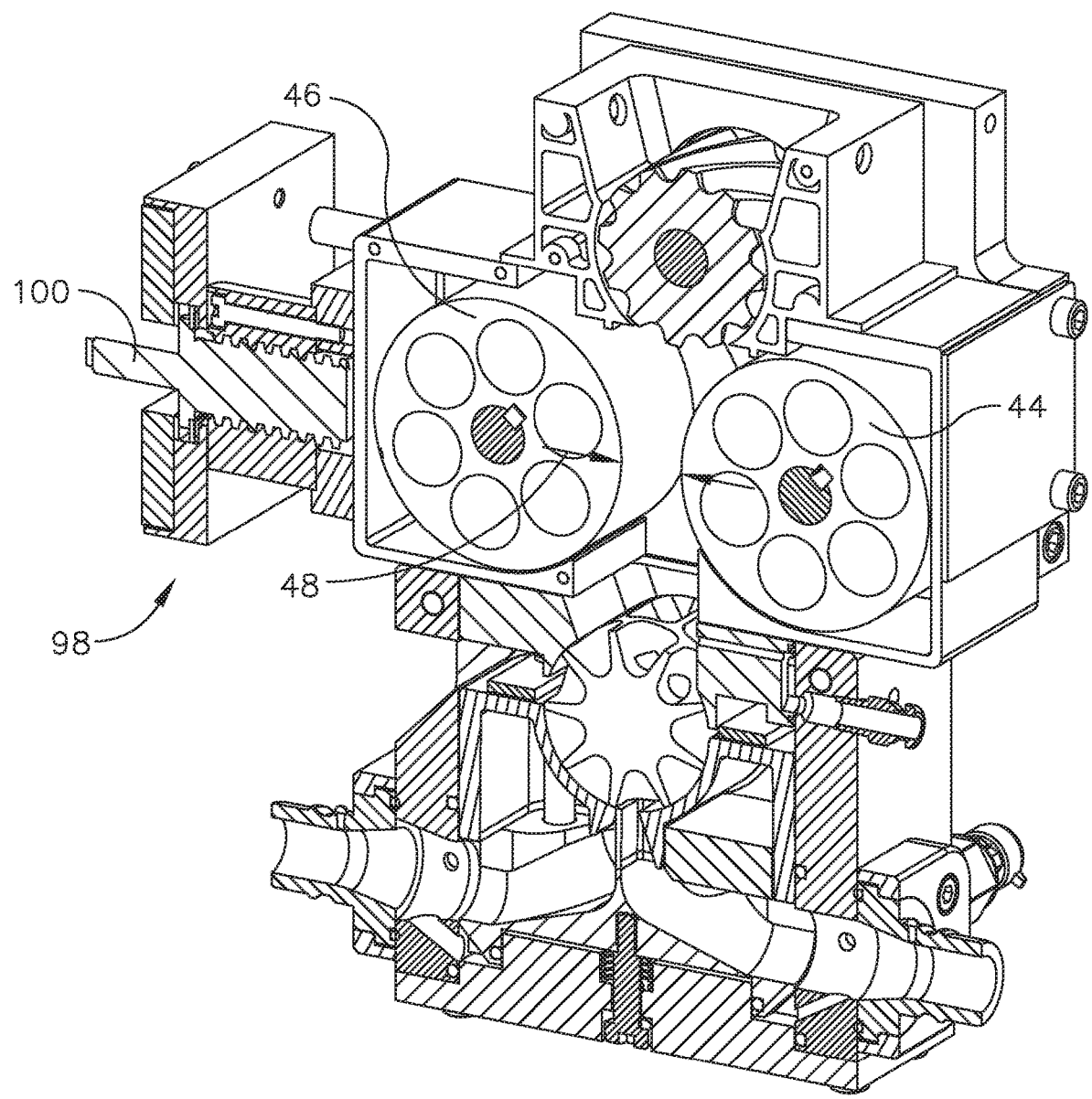
FIG. 10 is a cross-sectional perspective view of the feeder assembly, similar to FIG. 9, taken through a vertical plane which passes through the midline of the feeder assembly, illustrating a larger gap between the rollers of the comminutor.
Figure 11:
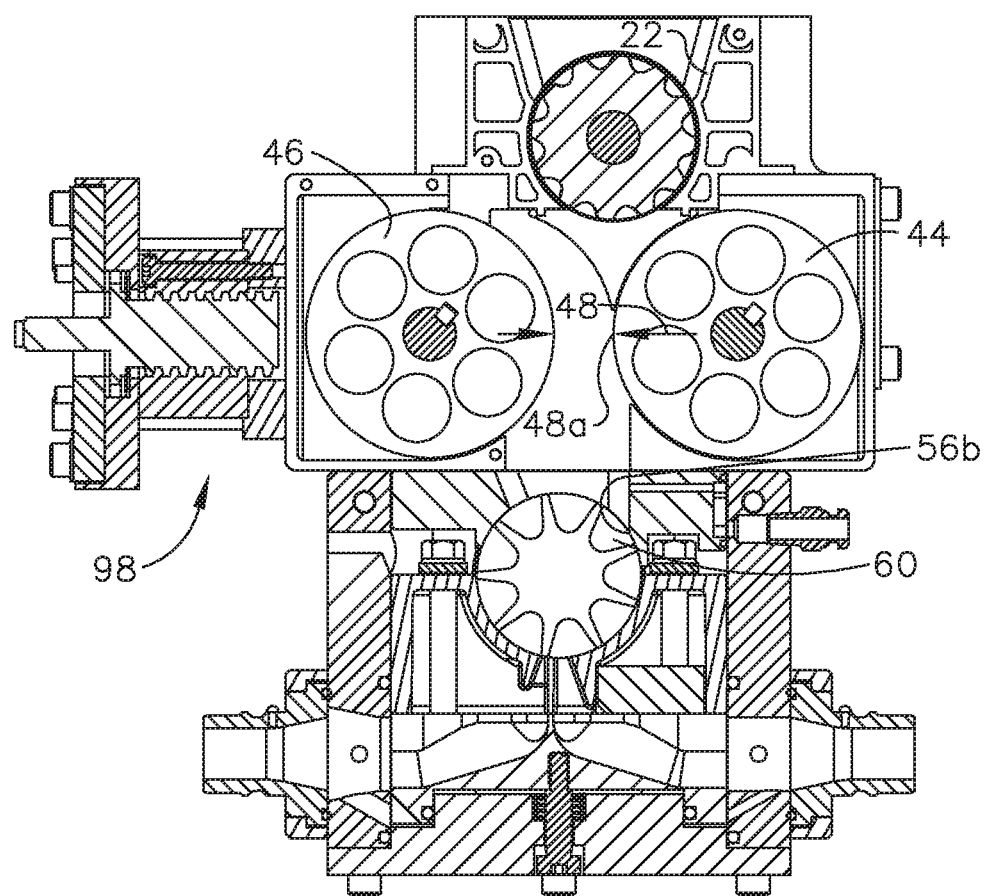
FIG. 11 is a cross-sectional side view of the feeder assembly taken at the same vertical plane as in FIG. 10, illustrating the same size gap between the rollers of the comminutor.

Referring to FIGS. 10 and 11, supports 96c, 96d (not visible in FIGS. 10 and 11) are disposed at the second position at which gap 48 is at its maximum. Roller 46 is spaced apart from roller 44 at a maximum distance. Regardless of the position of roller 46 and the concomitant size of gap 48, roller 44 remains in the same position. Roller 44 defines first edge 48a of gap 48, which also remains in the same position regardless of the position of roller 46.

First edge 48a is always disposed at a location disposed intermediate axis 54a and wiping edge 56a. Wiping edge 56a defines a boundary of wiping region 56b. Generally wiping region 56b extends about the width of one pocket 60 when the leading edge of such pocket 60 is disposed at wiping edge 56a. Wiping region 56b is in alignment with first edge 48a. When supports 96c, 96d are disposed at the first location at which the size of gap 48 is at a minimum, the entire gap is aligned with wiping region 56b, such that the comminuted particles may fall or be directed into pockets 60 proximal wiping edge 56a.

Figure 12:
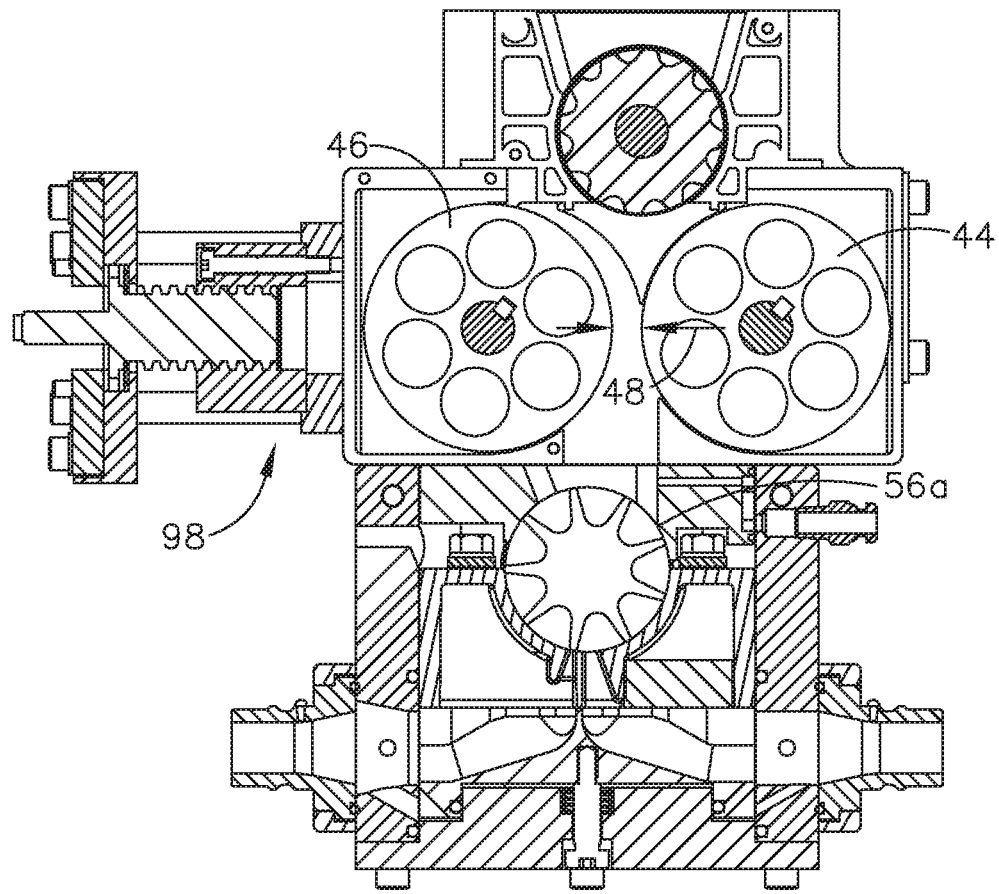
FIG. 12 is a cross-sectional side view of the feeder assembly similar to FIG. 11, illustrating a gap size smaller than the maximum gap size and larger than the minimum gap size.

FIG. 12 is similar to FIG. 11, depicting gap 48 at a size in between the maximum gap and minimum gap. Feeder assembly 20 is configured such that gap adjustment mechanism 98 may dispose supports 96c, 96d at a plurality of positions in-between the first and second positions such that gap 48 may be set at a plurality of sizes in-between the maximum gap and the minimum gap. In the depicted embodiment, the configuration of gap adjustment mechanism 98 essentially allows the size to be set at the maximum, minimum and any size in-between.

Figure 13:
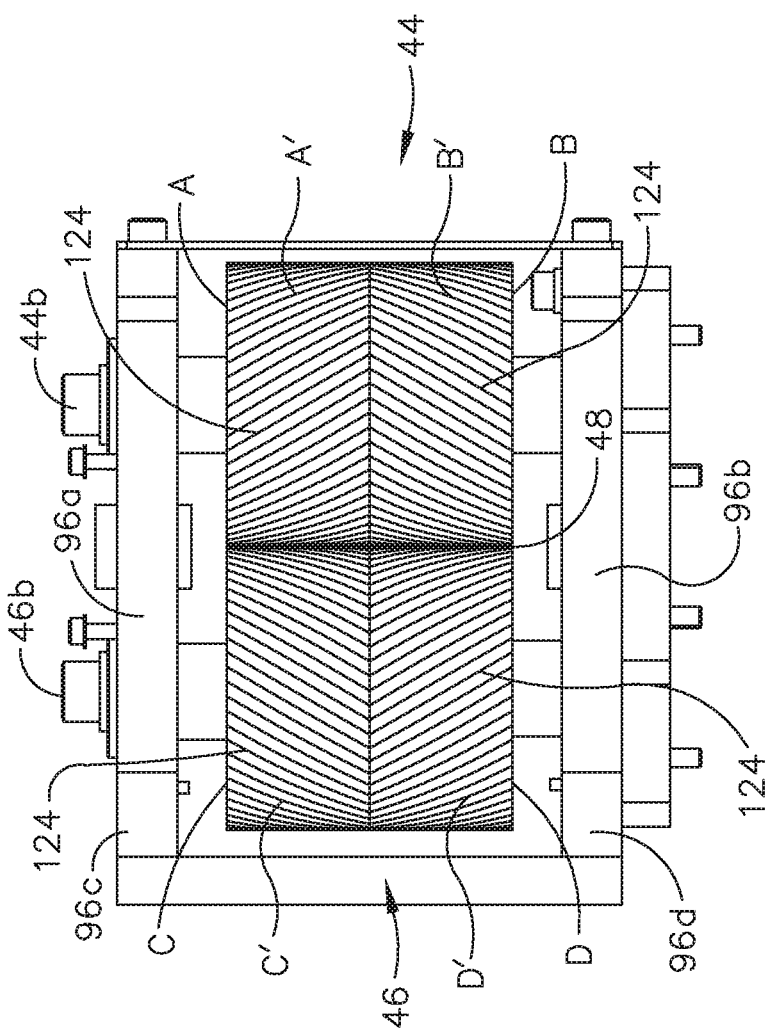
FIG. 13 is a top view of the rollers of the comminutor illustrating the diamond pattern formed by the raised ridges in the converging region.
Figure 14:
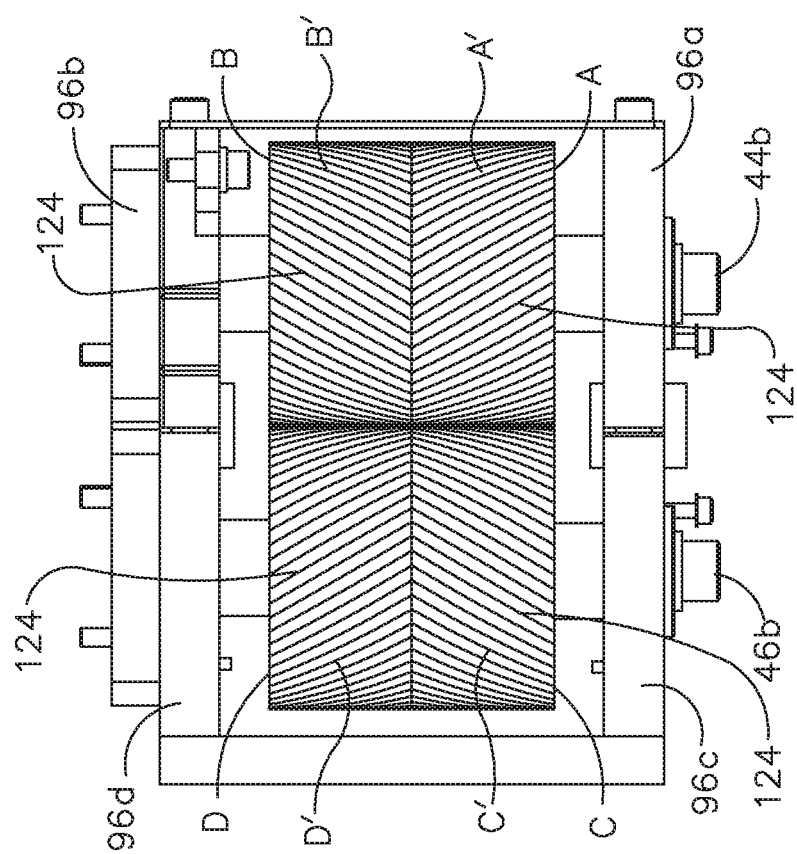
FIG. 14 is a bottom view of the rollers of the comminutor illustrating the X pattern formed by the raised ridges in the diverging region.

Peripheral surfaces 44c, 46c may be of any suitable configuration. In the embodiment depicted, peripheral surfaces 44c, 46c have a surface texture, which may be of any configuration. It is noted that for clarity, surface texture has been omitted from the figures except in FIGS. 13 and 14. FIGS. 13 and 14 illustrate rollers 44, 46 having a surface texture comprising a plurality of raised ridges 124. FIG. 13 illustrates rollers 44, 46 comprised of sub-rollers A, B, C and D, viewed from the top into converging region 50. Each peripheral surface A', B', C', D' comprises a plurality of raised ridges 124 disposed at an angle relative to either edge. The angle may be any suitable angle, such as 30° relative to the axial direction. In the embodiment depicted, the angles of each peripheral surface A', B', C', D' ridge are the same, although any suitable combination of angles may be used.

The surface texture in the depicted embodiment is configured to provide uniformity across the axial width of rollers 44, 46 of the comminuted particles discharged by comminutor 28 to feeding portion 30. Such uniformity is achieved in the depicted embodiment by the surface texture being configured to move particles entering comminutor 28 at converging region 50 toward the axial middle of rollers 44, 46. As seen in FIG. 13, the plurality of ridges 124 of roller 44 (sub-rollers A, B) and the plurality of ridges 124 of roller 46 (sub-rollers C, D) form a diamond pattern in converging region 50. At the interface between rollers A and B and rollers C and D, individual raised ridges 124 may or not precisely align.

When viewed from the bottom, the plurality of ridges 124 of roller 44 (sub-rollers A, B) and the plurality of ridges 124 of roller 46 (sub-rollers C, D) form an X pattern in the diverging region.

When viewed from the bottom, the plurality of ridges 124 of roller 44 (rollers A, B) and the plurality of ridges 124 of roller 46 (rollers C, D) form an X pattern in the diverging region.

Figure 15:
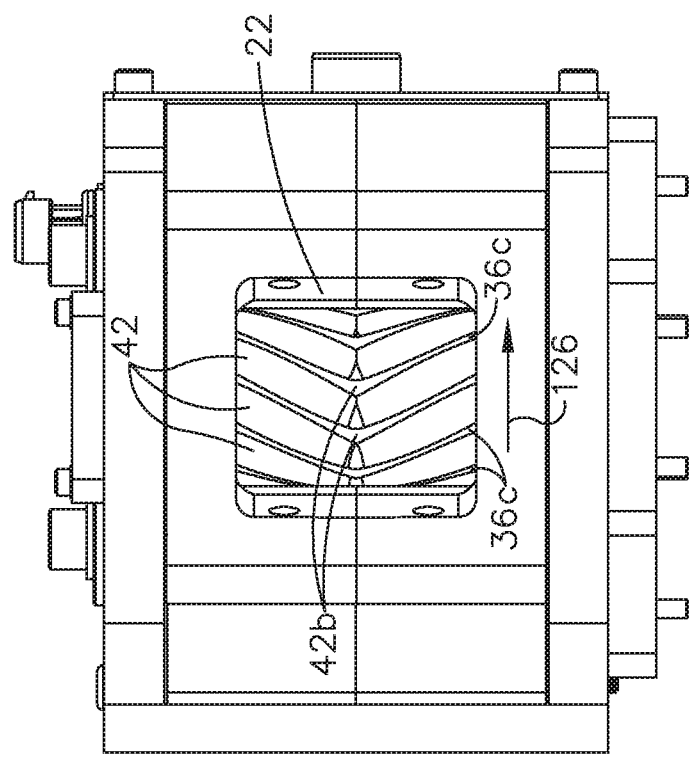
FIG. 15 is a top view of the metering element through the guide.

FIG. 15 shows a top view of metering rotor 36 through guide 22. Arrow 126 indicates the direction of rotation of metering rotor 36. Referring also to FIGS. 16, 17, 18 and 19, in the depicted embodiment, metering rotor 36 is configured to provide uniformity across the axial width of metering rotor 36 of the blast media particles discharged by metering rotor 36 at second region 40 to comminutor 28 and uniformity in the rate of discharge at second region 40. Such uniformity may be achieved in the depicted embodiment by the configuration of pockets 42. Metering rotor 36 may be made of any suitable material, such as UHMW or other polymers.

Figure 16:
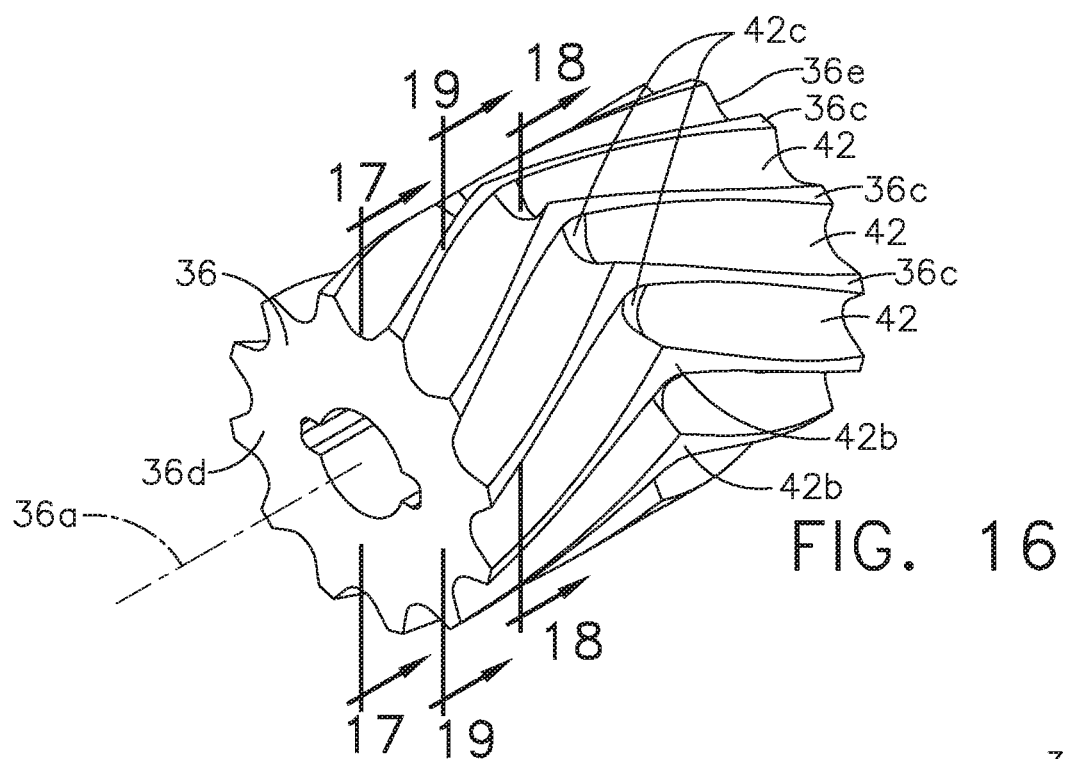
FIG. 16 is a perspective view of the metering element.

As seen in FIG. 16, metering rotor 36 comprises first end 36d and second end 36e which are spaced apart from each other along axis 36a. Pockets 42 extend from first end 36d to second end 36e. Pockets 42 when viewed radially toward axis 36a have a general V shape, also referred to herein as a chevron shape, with apex 42b pointed in the opposite direction of rotation. Pockets 42 when viewed axially have a general U shape. Any suitable axial shape may be used. Any suitable radial shape may be used, including pockets that extend straight from first end 36d to second end 36e.

In the depicted embodiment, pockets 42 are configured to promote movement of particles toward the axial center of pockets 42. As metering rotor 36 rotates in the direction of arrow 126, the axial inclination of the chevron shape may cause particles to move toward the axial center, resulting in more even distribution across the axial width of metering rotor 36.

Figure 17:
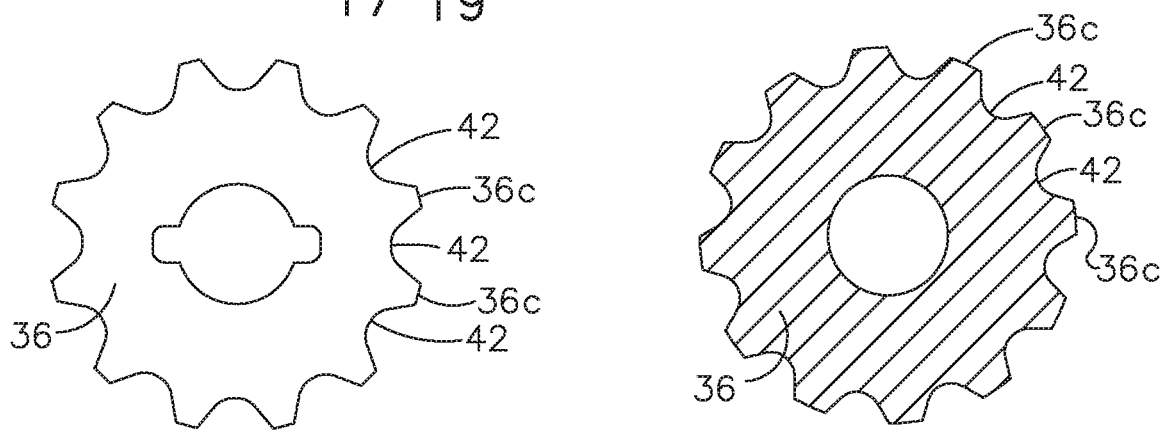
FIG. 17 is a plan view of the end profile of the metering element of FIG. 16, taken at line 17-17 of FIG. 16.
Figure 18:
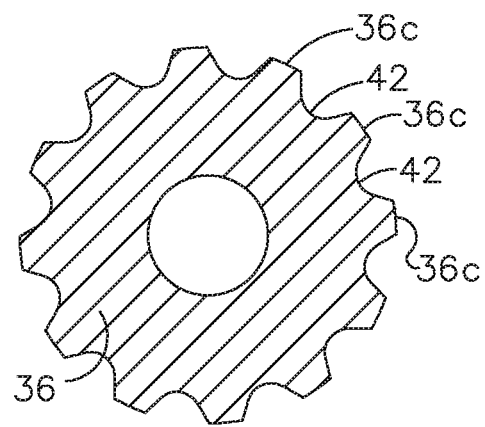
FIG. 18 is a plan view of a profile of the metering element of FIG. 16, taken at line 18-18 of FIG. 16.
Figure 19:
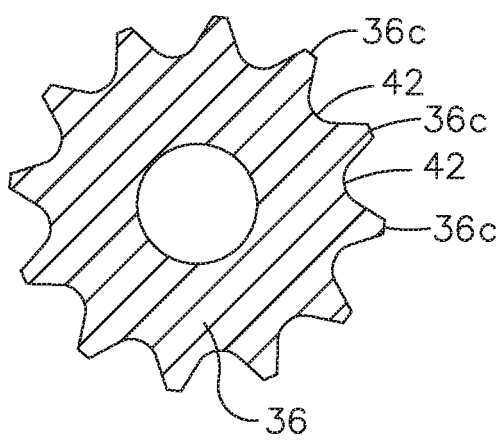
FIG. 19 is a plan view of a profile of the metering element of FIG. 16, taken at line 19-19 of FIG. 16.

FIGS. 17, 18 and 19 illustrate the axial profile of pockets 42 at the corresponding locations indicated in FIG. 16. FIG.

18 illustrates the profile of pockets 42 at apex 42b, the midpoint. At apex 42b, the angle of pockets 42 transition to the opposite, mirror angle, without a sharp intersection. A radius may be formed at this intersection to create a non-sharp transition 42c.

Figure 20:
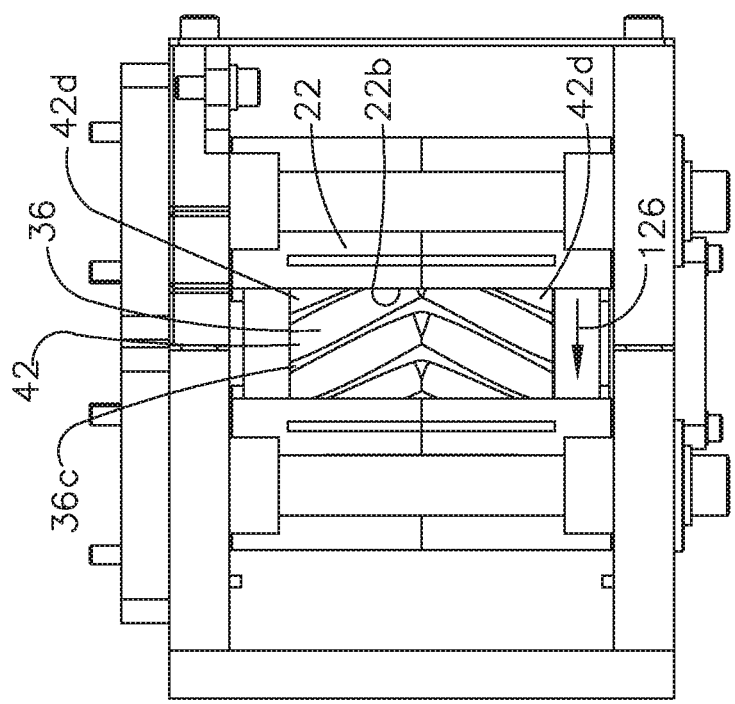
FIG. 20 is a bottom view of the metering element through the guide.

FIG. 20 is a view of metering rotor 36 looking upstream from the bottom, through second region 40. Discharge edge 22b is illustrated extending generally axially relative to axis 36a. As can be seen, the V or chevron shape of pockets 42 results in the outermost portions 42d of pockets 42 passing discharge edge 22b first, prior to apex 42b. With this configuration, only a small section of one of the lands of peripheral surface 36c arrives at discharge edge 22b, providing less pulsing than if each land forming peripheral surface 36c were axially straight.

As mentioned above, metering element 36 is configured to control the flow rate of blast media for particle blast apparatus 2. By separating the flow rate control from the feeding rotor, the delivery speed, pulsing at lower flow rates may be avoided. When the feeding rotor also controls the particle flow rate, to deliver lower flow rates, the rotational speed of the feeding rotor must be reduced. At lower speeds, due to the relative alignment of the pockets of the feeding rotor, pulsing occurs. Even with the pockets of the feeding rotor full, at lower rotational speeds of the feeding rotor, the time between the presentation of each opening for discharge is increased resulting in the pulsing.

In embodiments in which metering element 36 is present, feeding rotor 54 may be rotated at a constant, typically high, speed, independent of the feed rate. At a constant high speed, the time between the presentation of each opening for discharge is constant for all feed rates. At low feed rates with feeding rotor 54 rotating at a constant high speed, the percentage fill of each pocket will be smaller than at high feed rates, but pulsing will be reduced.

By separating the flow rate control from the feeding rotor, the feeding rotor may be operated closer to its optimal speed (based, for example, on component designs and characteristics, such as the motor profile, wear rate, etc.).

In the embodiment depicted, feeding rotor 54 may be operated at a constant rotation speed for all feed rates, such as 75 RPM to 80 RPM. In the embodiment depicted, comminutor 28 may be operated at a constant rotation speed for all speed rates, such as 1500 RPM for each roller 44, 46. In the embodiment depicted, metering rotor 36 may be operated at a rotation speed that varies so as to control the flow rate of particles.

For best operation, the flow of transport gas needs to be adequate and consistent providing the desired controllable flow and pressure. Although an outside source of gas, such as air, may be able to provide the desired flow and pressure in a controllable manner, outside sources are generally unreliable in this regard. Thus, for such consistency and control, prior art particle blast systems have included on board pressure regulation connected to an outside source of gas, such as air. Prior art particle blast systems have used a valve, such as a ball valve, as an on-off control of the incoming gas and regulated the pressure downstream thereof. Prior art pressure regulation has been accomplished by use of an inline pressure regulator disposed in the flow line with the desired pressure controlled by a fluid control signal, such as an air pressure signal from a pilot control pressure regulator. At higher transport gas flow rates, the inline pressure regulator produced high pressure losses. In the prior art, to make up for such pressure loss at higher flows, oversized inline pressure regulators or alternate non-regulated transport gas flow paths can be utilized, adding cost, complexity and undesirable increase in overall weight and size of design.

Figure 21:
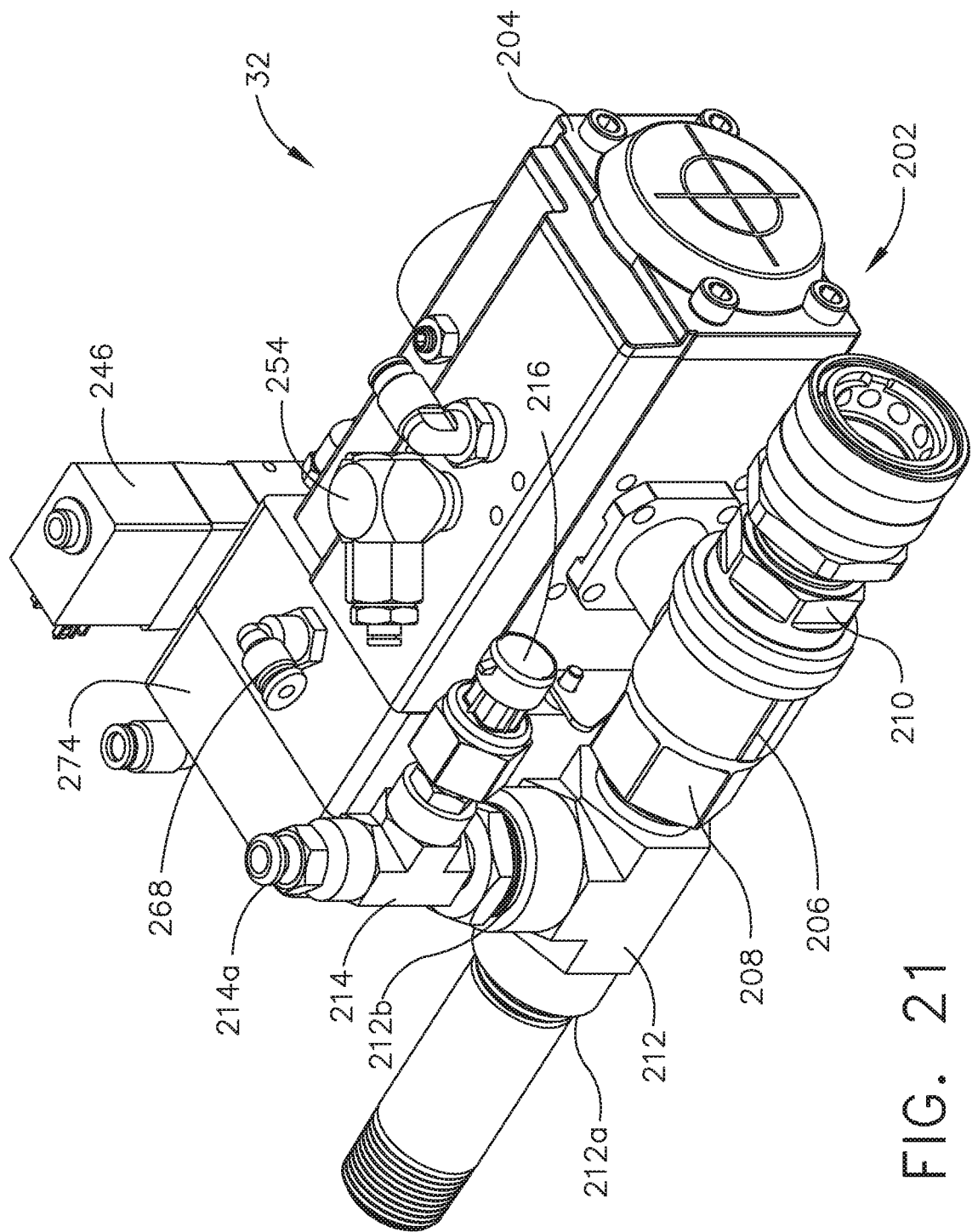
FIG. 21 is a perspective view of a pressure regulator assembly.

Referring to FIG. 21, pressure regulator assembly 32 of the embodiment depicted is shown. Pressure regulator 32 includes flow control valve, generally indicated at 202. Flow control valve 202 comprises actuator 204 and ball valve 206. Ball valve 206 includes inlet 208, which is connected to a source of transport gas, and outlet 210, which is connected through appropriate fitting 90 to inlet 86 and which may itself be considered a source of transport gas. In the embodiment depicted, T fitting 212 is connected to inlet 208. T fitting 212 includes inlet 212a which is connected to a source (not shown) of transport gas which, in the embodiment depicted, is not pressure regulated. T fitting includes outlet 212b which is connected to another T fitting 214, to which pressure sensor 216 is connected and senses the pressure within T fitting 214. Outlet 214a is configured to provide pressure and flow to other components of particle blast system 2.

Figure 22:
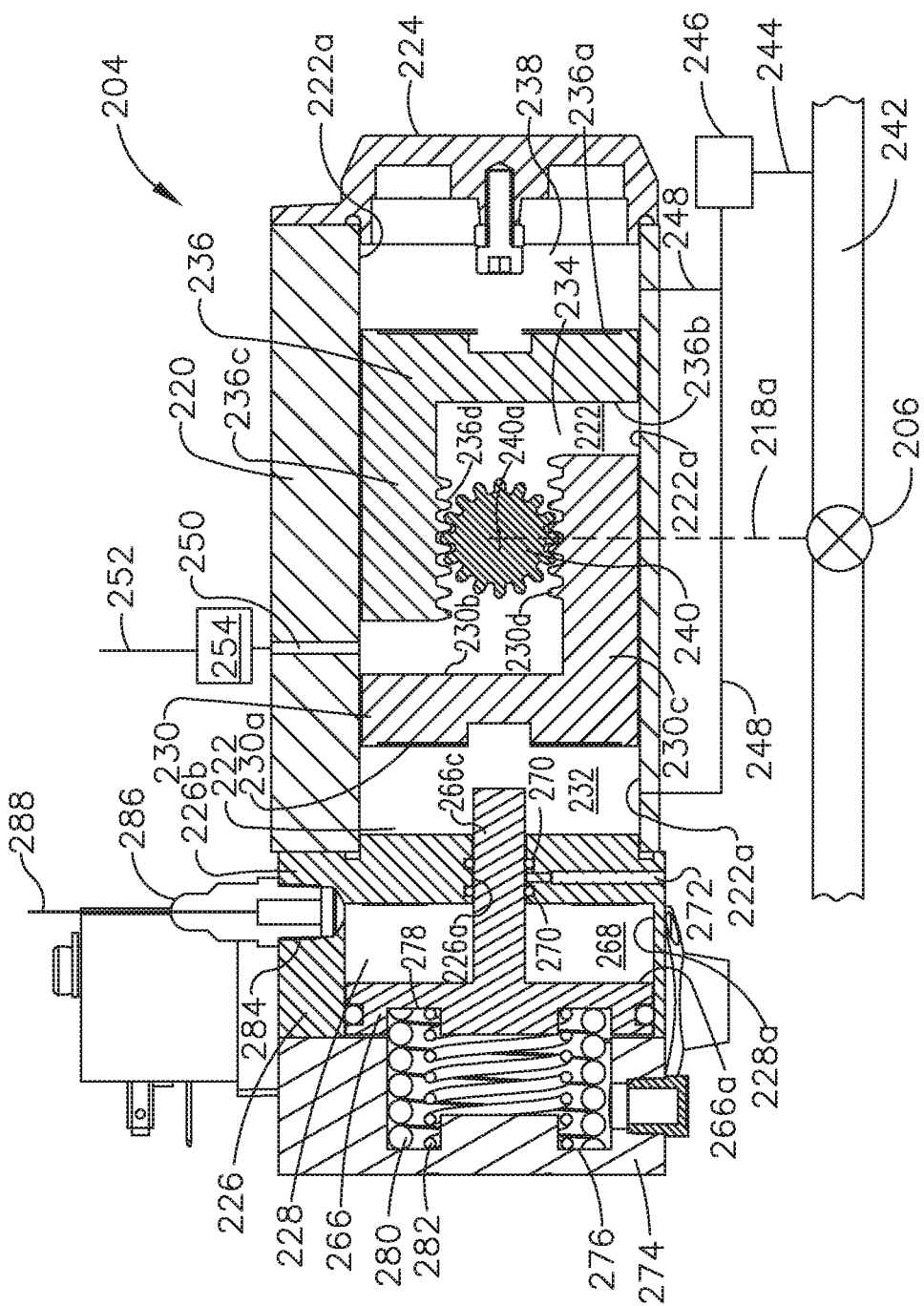
FIG. 22 is a cross-sectional top view of the actuator of the pressure regulator assembly of FIG. 21.

Referring to FIG. 22, a cross-sectional top view of actuator 204 is illustrated, with ball valve 206 illustrated diagrammatically. Actuator 204 is configured to be coupled with a controlled member, in the embodiment depicted, ball 218 (see FIG. 25) to move the controlled member between and including a first controlled position and a second controlled position. In the embodiment depicted, when ball 218 is at the second controlled position, ball valve 206 is closed. Actuator 204 comprises body 220 which defines first internal chamber 222, which is generally cylindrical, but which can be any suitable shape. At one end, end cap 224 is connected to body 220, sealing first internal chamber 222. At the other end, body 226 is connected to body 220, sealing internal chamber 222. Body 220 may be of unitary construction or of assembled pieces. Body 220 and body 226 may be of unitary construction. Body 226 defines second internal chamber 228.

Piston 230 is disposed in first internal chamber 222, sealingly engaging sidewall 222a. Within first internal chamber 222, piston 230 forms chamber 232 on first side 230a, and chamber 234 on second side 230b. Piston 236 is disposed in first internal chamber 222, sealingly engaging sidewall 222a. Within first internal chamber 222, piston 236 forms chamber 238 on first side 236a, with second chamber 234 disposed on second side 236b.

Piston 230 is shaped complementarily to sidewall 222a and includes extension 230c with teeth 230d. Piston 236 is shaped complementarily to sidewall 222a and includes extension 236c with teeth 236d. Teeth 230d and teeth 236d engage pinion 240 which is rotatable about axis 240a, which in the embodiment depicted, is aligned with axis 218b of stem 218a. Pinion 240 is coupled, directly or indirectly to stem 218a which in turn is connected to ball 218. Rotation of pinion 240 causes concomitant rotation of stem 281a and ball 218. Pinion 240 may be rotated between and including a first position and a second position, which correspond to the first and second positions of ball 218—when pinion 240 is at its first position, ball 218 is at its first position; when pinion 240 is at its second position, ball 218 is at its second position.

Pistons 230 and 236 also move between and including first and second positions, concomitantly due to their engagement with pinion 240. As pistons 230 and 236 move, they cause pinion 240 to rotate correspondingly. At their respective second positions, pistons 230 and 236 are at their minimum spaced apart distance relative to each other, causing pinion 240 and ball 218 to be at their respective second positions, making ball valve 206 closed. At their respective first positions, pistons 230 and 236 are at their maximum spaced apart distance relative to each other, causing pinion 240 and ball 218 to be at their respective first positions. In the embodiment depicted, ball valve 206 is a quarter turn valve and when ball 218 is at its first position, ball valve 206 is completely open. Although two pistons 230, 236 are illustrated, piston 236 could be omitted with piston 230 being appropriately sized.

Ball valve 206 regulates the pressure of the flow of transport gas into inlet 90. With reference to the pneumatic circuit schematic of FIG. 23, chambers 232 and 238 are in fluid communication with the flow passageway downstream of ball 218 so that the pressure within chambers 232 and 238 is the same as the actual static pressure in downstream passageway 242. In FIG. 22, this is diagrammatically illustrated by line 244, bypass valve 246 and line 248. Activation of bypass valve 246 allows the user to set ball valve 206 to completely open, bypassing/disabling the regulating function of ball valve 206. Lines 244, 248 may be of any suitable configuration.

Figure 23:
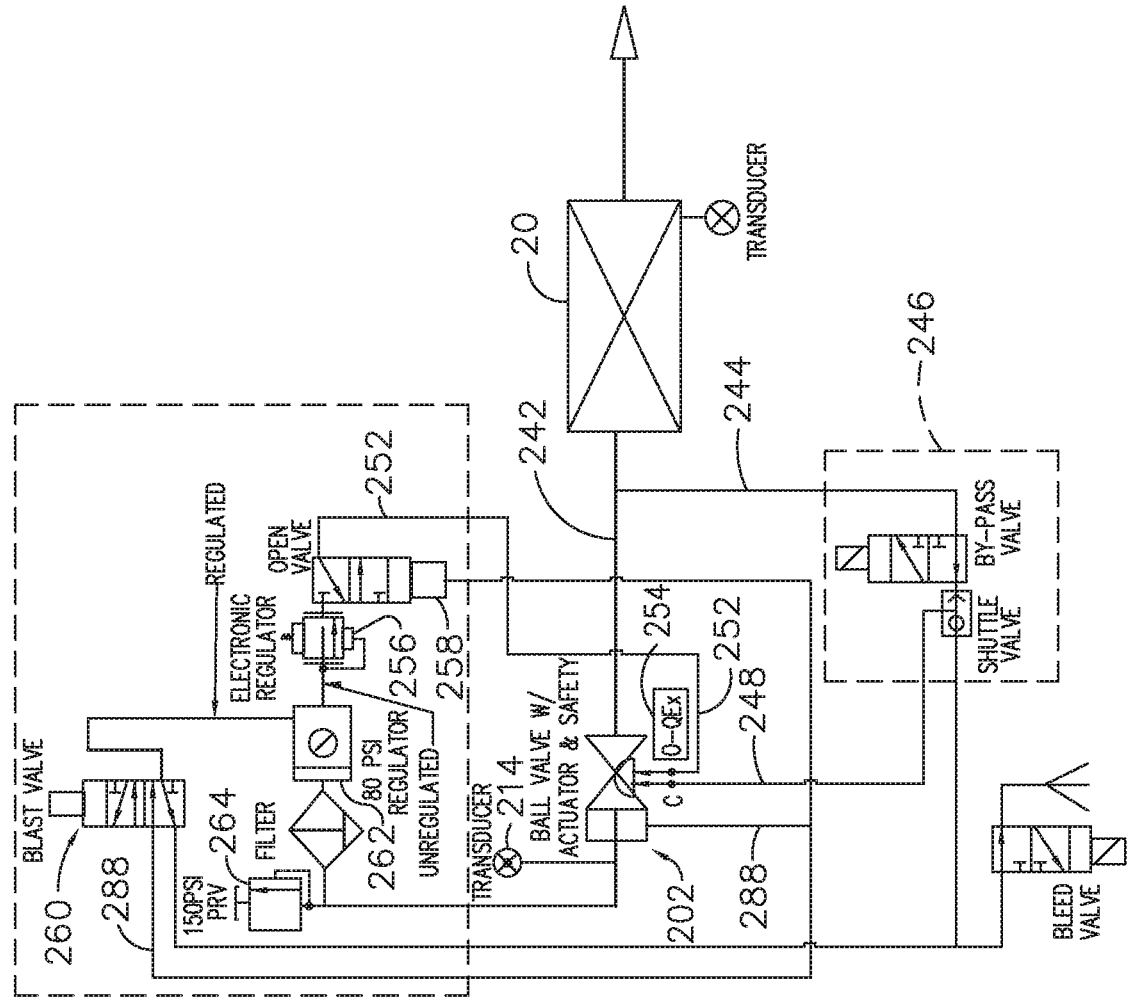
FIG. 23 is a schematic diagram of a pneumatic circuit.

Chamber 234 is placed in fluid communication with a pressure control signal, which either is or is proportional to the desired downstream pressure. As shown diagrammatically in FIG. 22, actuator 204 includes port 250 in fluid communication with chamber 234 which is configured to be connected to a pressure control signal by line 252. As illustrated, quick exhaust valve 254 may be interposed between port 250 and line 252, which may allow quick exhaust of the pressure within chamber 234 when desired, such as when ball valve 206 is being closed. The pressure of pressure control signal may be set by the operator. As seen in FIG. 23, pressure regulator 256 controls the pressure delivered to line 252 when control valve 258 is in the appropriate position. The position of control valve 258 is controlled by blast valve 260, which may be disposed in hand control 8. Actuation of blast valve 260 delivers regulated pressure flow from regulator 262 to control valve 258 causing it to move to the appropriate position for controlled pressure flow from pressure regulator 256 to flow to line 252. The pressure of the input to pressure regulator 256 may be unregulated as indicated in FIG. 23, it being noted that that input is regulated upstream thereof by regulator 264.

During operation, pressure within chamber 234, controlled by the pressure control signal delivered through line 252, will move pistons 230 and 236 outwardly, causing ball valve 206 to open, increasing the pressure in downstream flow passageway 242. As this pressure increases, the pressure within chamber 232 and 238 will increase and act on pistons 230 and 236 against the pressure in chamber 234, moving pistons 230 and 236 inwardly causing ball valve 206 to close, reducing the flow and the pressure in downstream flow passageway 242, which is the portion of the flow passageway downstream of ball 218, including the portion thereof within ball valve 206. Ball valve 206 will move to an equilibrium position at which the force on pistons 230 and 236 from chambers 232 and 238 equals the force on pistons 230 and 236 from chamber 234. Changes in pressure in chambers 232 and 238, such as due to changes in the upstream source pressure, or in chamber 234, such as due to a change by the operator, will result in ball valve 206 moving to a new equilibrium position.

As seen in FIG. 22, piston 266 is disposed in second internal chamber 228, sealingly engaging sidewall 228a. Within second internal chamber 228, piston 266 forms chamber 268 on first side 266a and chamber 290 (see FIG. 24) on second side 266b. Piston 266 is shaped complementarily to sidewall 228a and includes extension 266c which extends through bore 226a of end wall 226b, into chamber 232. A pair of spaced apart seals 270 disposed in annular grooves in bore 226a seal between chamber 232 and 228 against extension 266c. Vent 272 vents the area between seals 270 so that there will be a difference in pressure across the seals for all the seals to effectively be compression loaded in the seal grooves and prevent leakage.

End cap 274 is connected to body 226, and includes annular groove 276, which is shaped complementarily to and aligned with annular groove 278. Piston 266 is moveable between and including a first position at which the internal volume of chamber 228 is at its maximum and a second position at which the internal volume of chamber 228 is at its minimum, whereat extension 266c extends its maximum distance into chamber 232.

The ends of springs 280 and 282 are disposed in annular grooves 276 and 278 and configured to resiliently bias piston 266 toward the second position. In FIG. 22, with piston 266 in its first position, springs 280 and 282 are in their most compressed state, urging piston to the right to move to its second position. Although two springs are shown, there need be only at least one resilient member to resiliently urge piston 266 toward its second position.

To hold piston 266 in its first position, chamber 268 may be selectively pressurized with sufficient pressure to overcome the force exerted by springs 280 and 282. Body 226 includes port 284 in fluid communication with chamber 268. Fitting 286 is illustrated disposed in port 284, with line 288 in fluid communication with chamber 228 through fitting 286. Line 288 is connected to a source of pressurized fluid, such as air, so that chamber 268 can be pressurized. As seen in FIG. 23, pressure in line 288 is controlled by blast valve 260. Actuation of blast valve 260 delivers pressure to line 288 and ultimately chamber 268 such that piston 266 is held in its first position, overcoming the force exerted by springs 280 and 282. At this position, piston 230 has its full range of motion from its first position to its second position.

Figure 24:
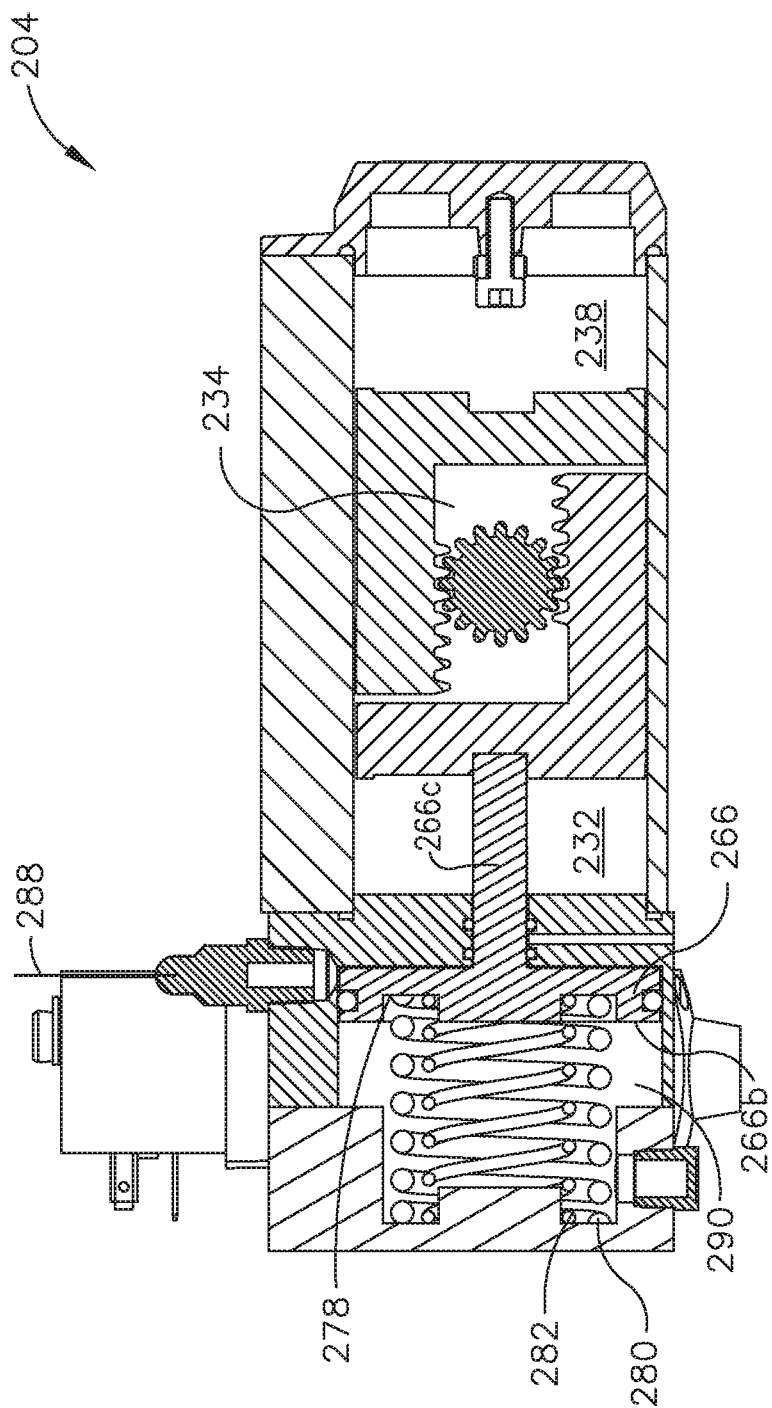
FIG. 24 is a cross-sectional top view of the actuator similar to FIG. 21.

Referring to FIGS. 22, 23 and 24, when blast valve 260 is released, pressure within chamber 268 is vented through blast valve 260 via line 288, allowing springs 280 and 282 to immediately move piston 266 from its first position (FIG. 22) to its second position (FIG. 24). As piston 266 moves from its first position to its second position, part of piston 266, extension 266c, engages piston 230 and moves piston 230 to its second position, at which ball valve 206 is closed. Concomitantly with the release of blast valve 260, pressure to line 252 is interrupted resulting in control valve 258 to interrupt the pressurization of chamber 234. With the drop in pressure of chamber 234, quick exhaust valve 254 allows venting of chamber 234 as piston 230 is moved by extension 266c.

Figure 25:
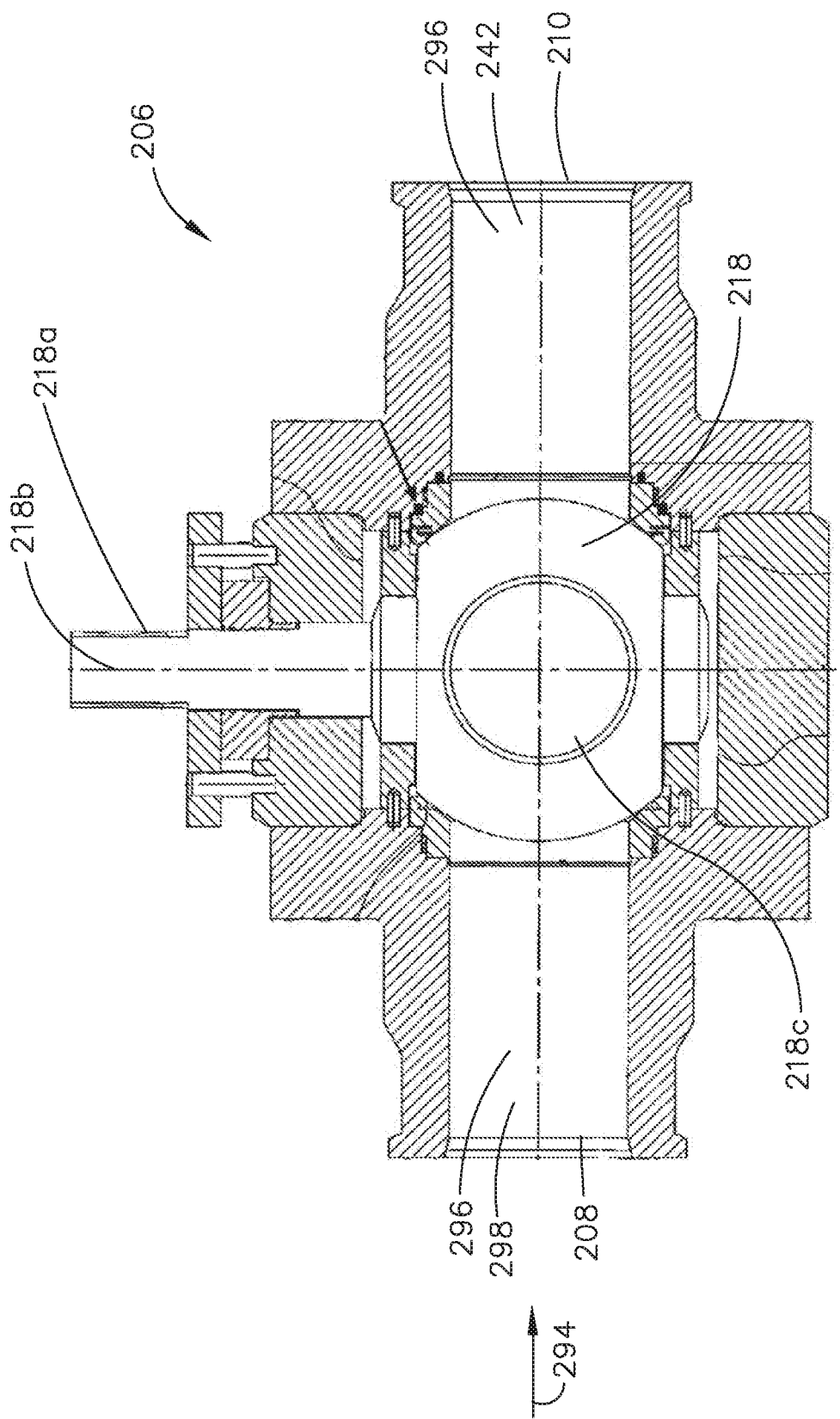
FIG. 25 is a cross-sectional side view of a ball valve.

FIG. 25 illustrates an exemplary ball valve used to explain a construction of ball valve 206, so thus FIG. 25 is correspondingly so numbered. Ball valve 206 comprises ball 218 having stem 218a which is rotatable about axis 218b. The transport gas flows through ball valve 206 in the direction indicated by arrow 294. Flow passageway 296 comprises upstream flow passageway 298, which is located upstream of ball 218, and downstream flow passageway 242, which is located downstream of ball 218. Ball 218 is controlled to move between and including a first position, at which ball valve 206 is completely open with ball passageway 218c aligned with flow passageway 296, and a second position, at which ball valve 206 is closed with ball 218 completely blocking flow passageway 296 as illustrated in FIG. 25.

Example 1

A feeder assembly configured to transport blast media from a source of blast media into a flow of transport gas, the blast media comprising a plurality of particles, the feeder assembly comprising: a metering element configured to: receive from a first region the blast media from the source of blast media; and discharge the blast media to a second region; and a feeding rotor, configured to: receive, at a third region, blast media discharged by the metering rotor; and discharge the blast media into the flow of transport gas.

Example 2

The feeder assembly of example 1, comprising a comminutor disposed between the metering element and the feeding rotor, the comminutor configured to receive blast media from the metering element and to selectively reduce the size of a plurality of the plurality of particles from each particle's respective initial size to a second size which is smaller than a predetermined size.

Example 3

The feeder assembly of example 1, wherein the metering element comprises a rotor which is rotatable about an axis, the rotor comprising a plurality of pockets opening radially outwardly.

Example 4

The feeder assembly of example 3, wherein the plurality of pockets extend longitudinally in the direction of the axis.

Example 5

The feeder assembly of example 3, wherein the rotor comprises a first end and a second end spaced apart from each other along the axis, and where a plurality of the plurality of pockets extend from the first end to the second end.

Example 6

The feeder assembly of example 3, wherein the rotor is rotatable about the axis in a direction of rotation, wherein a plurality of the plurality of pockets have a chevron shape.

Example 7

The feeder assembly of example 6, wherein the chevron shape points opposite the direction of rotation.

Example 8

A comminutor configured to selectively reduce the size of cryogenic particles from each particle's respective initial size to a second size which is smaller than a predetermined size, the comminutor being adapted to be disposed between a metering portion and a feeding portion of a feeder assembly, the feeder assembly configured to transport the cryogenic particles from a source of cryogenic particles into a flow of transport gas, the metering portion configured to receive cryogenic particles from a source of cryogenic particles and to discharge cryogenic particles to the comminutor, the feeding portion configured to receive cryogenic particles from the comminutor and discharge the cryogenic particles into the flow of transport gas.

Example 9

The comminutor of example 8, comprising: an inlet adapted to be disposed to receive cryogenic particles from the metering portion; and an outlet adapted to be disposed to discharge cryogenic particles to the feeding portion.

Example 10

The comminutor of example 9, comprising a gap disposed between the inlet and the outlet, the gap being variable between a minimum gap and a maximum gap.

Example 11

The comminutor of example 10, comprising: at least one first roller rotatable about a first axis; at least one second roller rotatable about a second axis, the gap being defined by the at least one first roller and the at least one second roller; a support which carries the at least one second roller, the support configured to be disposed at a plurality of positions between and including a first position at which the gap is the minimum gap and a second position at which the gap is the maximum gap.

Example 12

A comminutor configured to selectively reduce the size of cryogenic particles from each particle's respective initial size to a second size which is smaller than a predetermined size, the comminutor comprising: at least one first roller rotatable about a first axis, each said at least one first roller comprising a respective first peripheral surface, each respective first peripheral surface collectively comprising a plurality of first raised ridges; at least one second roller rotatable about a second axis, each said at least one second roller comprising a respective second peripheral surface, each respective second peripheral surface collectively comprising a plurality of second raised ridges; a gap defined between each respective first peripheral surface and each respective second peripheral surface; and a converging region upstream of the gap defined by the gap, the at least one first roller and the at least one second roller, wherein the plurality of first raised ridges and the plurality of second raised ridges form a diamond pattern in the converging region.

Example 13

The comminutor of example 12, wherein the at least one first roller comprises an A roller and a B roller, the A roller comprising an A peripheral surface, the B roller comprising a B peripheral surface, the first peripheral surface comprising the A peripheral surface and the B peripheral surface.

Example 14

The comminutor of example 13, wherein the at least one second roller comprises a C roller and a D roller, the C roller comprising a C peripheral surface, the D roller comprising a D peripheral surface, the second peripheral surface comprising the C peripheral surface and the D peripheral surface.

Example 15

The comminutor of example 13, wherein the A peripheral surface is a mirror image of the B peripheral surface.

Example 16

The comminutor of example 12 comprising a support which carries the at least one second roller, the support configured to be disposed at a plurality of positions between and including a first position at which the gap is at its minimum and a second position at which the gap is at is its maximum.

Example 17

The comminutor of example 12, wherein the diamond pattern is a double diamond pattern.

Example 18

A particle blast system comprising: a source of blast media, the blast media comprising a plurality of cryogenic particles; a discharge nozzle for expelling the cryogenic particles from said particle blast system; a particle flow path extending between the source of blast media and the discharge nozzle, the particle flow path comprising a comminutor configured to selectively reduce the size of particles from each particle's respective initial size to a second size which is smaller than a predetermined size, the comminutor comprising: at least one first roller, each said at least one first roller comprising a respective first peripheral surface, each respective first peripheral surface collectively comprising a plurality of first raised ridges; at least one second roller, each said at least one second roller comprising a respective second peripheral surface, each respective second peripheral surface collectively comprising a plurality of second raised ridges; a gap defined between each respective first peripheral surface and each respective second peripheral surface; and a converging region upstream of the gap defined by the gap, the at least one first roller and the at least one second roller, wherein the plurality of first raised ridges and the plurality of second raised ridges form a diamond pattern in the converging region.

Example 19

The particle blast system of example 18, wherein said particle flow path comprises a low pressure portion and a high pressure portion disposed downstream of the low pressure portion, and the low pressure portion comprises the comminutor.

Example 20

The particle blast system of example 18, wherein the at least one first roller comprises an A roller and a B roller, the A roller comprising an A peripheral surface, the B roller comprising a B peripheral surface, the first peripheral surface comprising the A peripheral surface and the B peripheral surface.

Example 21

The particle blast system of example 18 comprising a support which carries the at least one second roller, the support configured to be disposed at a plurality of positions between and including a first position at which the gap is at its minimum and a second position at which the gap is at is its maximum.

Example 22

The particle blast system of example 18, wherein the diamond pattern is a double diamond pattern.

Example 23

A feeder assembly configured to transport blast media from a source of blast media into a flow of transport gas, the blast media comprising a plurality of cryogenic particles, the feeder assembly comprising: particle flow path comprising a low pressure portion and a high pressure portion disposed downstream of the low pressure portion; and the low pressure portion comprising a comminutor configured to selectively reduce the size of cryogenic particles from each particle's respective initial size to a second size which is smaller than a predetermined size, the comminutor comprising: at least one first roller, each said at least one first roller comprising a respective first peripheral surface, each respective first peripheral surface collectively comprising a plurality of first raised ridges; at least one second roller, each said at least one second roller comprising a respective second peripheral surface, each respective second peripheral surface collectively comprising a plurality of second raised ridges; a gap defined between each respective first peripheral surface and each respective second peripheral surface; and a converging region upstream of the gap defined by the gap, the at least one first roller and the at least one second roller, wherein the plurality of first raised ridges and the plurality of second raised ridges form a diamond pattern in the converging region.

Example 24

The feeder assembly of example 23, wherein the at least one first roller comprises an A roller and a B roller, the A roller comprising an A peripheral surface, the B roller comprising a B peripheral surface, the first peripheral surface comprising the A peripheral surface and the B peripheral surface.

Example 25

The feeder assembly of example 23, wherein the diamond pattern is a double diamond pattern.

Example 26

A feeder assembly configured to transport blast media from a source of blast media into a flow of transport gas, the blast media comprising a plurality of particles, the feeder assembly comprising: a comminutor configured to selectively reduce the size of cryogenic particles from each particle's respective initial size to a second size which is smaller than a predetermined size, the comminutor comprising: at least one first roller rotatable about a first axis, each said at least one first roller comprising a respective first peripheral surface; at least one second roller rotatable about a second axis, each said at least one second roller comprising a respective second peripheral surface; and a gap defined between each respective first peripheral surface and each respective second peripheral surface, the gap comprising a first edge extending along and adjacent to each respective first at least one first roller; a feeding rotor rotatable about a third axis, the feeding rotor comprising: a circumferential surface; a plurality of pockets disposed in the circumferential surface, each of the plurality of pockets having a respective circumferential pocket width; a guide disposed between the gap and the feeding rotor configured to receive particles from the gap and guide the particles into the plurality of pockets as the feeding rotor rotates, the guide comprising: a wiping edge disposed adjacent the circumferential surface, the wiping edge oriented generally parallel to the third axis; a wiping region extending circumferentially away from the wiping edge, the wiping region disposed in alignment with the first edge.

Example 27

The feeder assembly of example 26, wherein the wiping region extends circumferentially away from the wiping edges a distance approximately equal to one of the respective circumferential pocket widths.

Example 28

A feeder assembly configured to transport blast media from a source of blast media into a flow of transport gas, the blast media comprising a plurality of particles, the feeder assembly comprising: a metering element comprising: a first surface; and at least one cavity comprising a respective opening in the first surface, the metering element configured to cyclically dispose each of the at least one cavity at a first position to receive particles into the at least one cavity and at a second to discharge the particles, the respective opening moving in a direction of travel when moving between the first position to the second position; and a guide disposed adjacent the metering element, the guide configured to guide the particles into each respective opening at the first position, the guide comprising: a wiping edge disposed adjacent the first surface, the wiping edge configured to wipe across each respective opening as each of the at least one cavity moves from the first position to the second position, the wiping edge disposed at a wiping angle which is configured to not result in a nip line between the wiping edge and the metering element.

Example 29

The feeder assembly of example 28, wherein the wiping angle is at least about 90°.

Example 30

A metering rotor adapted for use with a feeder assembly, the feeder assembly configured to transport blast media from a source of blast media into a flow of transport gas, the metering rotor comprising: a first end; a second end spaced apart from the first end along an axis; a plurality of pockets extending from the first end to the second end and opening radially outward.

Example 31

The metering rotor of example 30, wherein a plurality of the plurality of pockets have a chevron shape.

Example 32

A roller adapted for use as one of at least one first roller of a comminutor, the comminutor configured to selectively reduce the size of cryogenic particles from each particle's respective initial size to a second size which is smaller than a predetermined size, the comminutor comprising: the least one first roller; at least one second roller, each said at least one second roller comprising a respective second peripheral surface, each respective second peripheral surface collectively comprising a plurality of second raised ridges; a gap defined between the at least one first roller and the at least one second roller; a converging region upstream of the gap defined by the gap, the at least one first roller and the at least one second roller; and an outlet side downstream of the gap defined by the gap, the at least one first roller and the at least one second roller, the roller comprising a peripheral surface comprising a plurality of first raised ridges which, when the roller is used as the at least one of the at least one first roller, form part of a diamond pattern in the converging region in cooperation with the plurality of second raised ridges, the diamond pattern extending from the gap.

Example 33

An actuator configured to couple with a controlled member to move the controlled member between and including a first controlled position and a second controlled position, the actuator comprising: a body defining a first internal chamber, the first internal chamber comprising a first sidewall; a first piston comprising a first side and a second side, the first piston disposed in the first internal chamber and moveable between and including a first position and a second position, the first piston sealingly engaging the first sidewall thereby forming a first chamber on the first side of the first piston and a second chamber on the second side of the first piston; a second internal chamber, the second internal chamber comprising a second sidewall; a second piston comprising a first side and a second side, the second piston disposed in the second internal chamber and moveable between and including a third position and a fourth position, the second piston sealingly engaging the second sidewall thereby forming a third chamber on the first side of the second piston and a fourth chamber on the second side of the second piston, the second piston configured to not engage the first piston when the second piston is disposed at the third position, the second piston configured to: engage the first piston with a part of the second piston; and move the first piston to the second position as the second piston moves from the third position to the fourth position; and at least one resilient member disposed in the fourth chamber and resiliently urging the second piston toward the fourth position.

Example 34

The actuator of example 33, comprising a valve, the valve comprising the controlled member, wherein the first piston is connected to the valve.

Example 35

The actuator of example 34, wherein the valve comprises a rotary member and a stem connected to the rotary member, wherein the first piston is connected to the stem.

Example 36

The actuator of example 34, comprising a third piston comprising a first side and a second side, the third piston disposed in the first internal chamber and moveable between and including a fifth and a sixth position, the third piston sealingly engaging the first sidewall thereby forming a fifth chamber on the first side of the third piston, the second chamber disposed on the second side of the third piston, wherein the third piston is connected to the valve.

Example 37

The actuator of example 33, comprising a third piston comprising a first side and a second side, the third piston disposed in the first internal chamber and moveable between and including a fifth and a sixth position, the third piston sealingly engaging the first sidewall thereby forming a fifth chamber on the first side of the third piston, the second chamber disposed on the second side of the third piston.

Example 38

The actuator of example 33, comprising a first port in fluid communication with the second chamber, the first port configured to be connected to a fluid control signal.

Example 39

The actuator of example 33, comprising a first port in fluid communication with the second chamber, and a quick exhaust valve in fluid communication with the first port, the quick exhaust valve configured to be connected to a fluid control signal.

Example 40

A fluid control valve comprising: a flow passageway; a rotary member disposed in the flow passageway dividing the flow passageway into an upstream flow passageway and a downstream flow passageway, the rotary member being moveable between and including a first and a second position, the flow passageway being closed when the rotary member is disposed at the first position; a stem connected to the rotary member; an actuator comprising: a body defining a first internal chamber, the first internal chamber comprising a first sidewall; a first piston comprising a first side and a second side, the first piston disposed in the first internal chamber and moveable between and including a first position and a second position, the first piston sealingly engaging the first sidewall thereby forming a first chamber on the first side of the first piston and a second chamber on the second side of the first piston, the first piston operably connected to the stem and configured to rotate the stem such that when the first piston is disposed at its first position the rotary member is disposed at its first position and when the first piston is disposed at its second position the rotary member is disposed at its second position; a second internal chamber, the second internal chamber comprising a second sidewall; a second piston comprising a first side and a second side, the second piston disposed in the second internal chamber and moveable between and including a third position and a fourth position, the second piston sealingly engaging the second sidewall thereby forming a third chamber on the first side of the second piston and a fourth chamber on the second side of the second piston, the second piston configured to not engage the first piston when the second piston is disposed at the third position, the second piston configured to engage the first piston with a part of the second piston; and move the first piston to the second position as the second piston moves from the third position to the fourth position; and a resilient member disposed in the fourth chamber and resiliently urging the second piston toward the fourth position.

Example 41

The fluid control valve of example 40, wherein the first chamber is in fluid communication with the downstream flow passageway.

Example 42

A method of entraining a plurality of particles of blast media in a flow of transport gas comprising the steps of: controlling, at a first location, the flow rate of the particles from a source of particles, optionally using a metering element; and entraining the particles into the flow of transport gas at a second location using a feeding rotor.

Example 43

A method of entraining a plurality of particles of blast media in a flow of transport gas comprising the steps of: controlling, at a first location, the flow rate of the particles from a source of particles, optionally using a metering element; comminuting, at a second location downstream of the first location, a plurality of the plurality of particles from each particle's respective initial size to a second size smaller than a predetermined size; and entraining, at a third location downstream of the second location, the particles into the flow of transport gas at a third location using a feeding rotor.

The foregoing description of one or more embodiments of the innovation has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the innovation and its practical application to thereby enable one of ordinary skill in the art to best utilize the innovation in various embodiments and with various modifications as are suited to the particular use contemplated. Although only a limited number of embodiments of the innovation is explained in detail, it is to be understood that the innovation is not limited in its scope to the details of construction and arrangement of components set forth in the preceding description or illustrated in the drawings. The innovation is capable of other embodiments and of being practiced or carried out in various ways. Also specific terminology was used for the sake of clarity. It is to be understood that each specific term includes all technical equivalents which operate in a similar manner to accomplish a similar purpose. It is intended that the scope of the invention be defined by the claims submitted herewith.

The invention claimed is:

1. A feeder assembly configured to transport blast media from a source of blast media into a flow of transport gas, the blast media comprising a plurality of cryogenic particles, the feeder assembly comprising:
   a. a particle flow path comprising a low pressure portion and a high pressure portion disposed downstream of the low pressure portion;
   b. a seal separating the flow of transport gas from the low pressure portion; and
   c. the low pressure portion comprising a comminutor configured to reduce the size of a plurality of the plurality of cryogenic particles from each particle's respective initial size to a second size which is smaller than a predetermined size.

2. A feeder assembly configured to transport blast media from a source of blast media into a flow of transport gas, the blast media comprising a plurality of particles, each particle of the plurality having a respective initial size, the feeder assembly comprising:
   a. a comminutor configured to selectively reduce the size of cryogenic particles from each particle's respective initial size to a second size which is smaller than a predetermined size, the comminutor comprising:
      i. a first roller rotatable about a first axis, said first roller comprising a first peripheral surface;
      ii. a second roller rotatable about a second axis, said second roller comprising a second peripheral surface; and
      iii. a gap defined between said first peripheral surface and said second peripheral surface, the gap comprising a first edge extending along and adjacent to said first peripheral surface and said first roller;
   b. a feeding rotor rotatable about a third axis, the feeding rotor comprising:
      i. a circumferential surface;
      ii. a plurality of pockets disposed in the circumferential surface, each of the plurality of pockets having a respective circumferential pocket width;
   c. a guide disposed between the gap and the feeding rotor, said guide configured to receive particles from the gap and guide the particles into the plurality of pockets as the feeding rotor rotates, the guide comprising:
      i. a wiping edge disposed adjacent the circumferential surface, the wiping edge oriented generally parallel to the third axis;
      ii. a wiping region extending circumferentially away from the wiping edge, the wiping region disposed in alignment with the first edge.

3. The feeder assembly of claim 2, wherein the wiping region extends circumferentially away from the wiping edge a distance equal to one of the respective circumferential pocket widths.

4. A feeder assembly configured to transport blast media from a source of blast media into a flow of transport gas, the blast media comprising a plurality of particles, the feeder assembly comprising:
   a. a metering element configured to control a rate of flow of the plurality of particles through the feeder assembly, the metering element comprising:
      i. a first surface; and
      ii. at least one cavity comprising a respective opening in the first surface,
      the metering element configured to cyclically dispose the at least one cavity at a first position to receive the plurality of particles into the at least one cavity and at a second position to discharge the plurality of particles, the respective opening moving in a direction of travel when moving between the first position to the second position; and
   b. a guide disposed adjacent the metering element, the guide configured to guide the plurality of particles into each respective opening at the first position, the guide comprising:
      i. a wiping edge disposed adjacent the first surface, the wiping edge configured to wipe across each respective opening as each of the at least one cavity moves from the first position to the second position, the wiping edge disposed at a wiping angle which is configured to not result in a nip line between the wiping edge and the metering element.

5. The feeder assembly of claim 4, wherein the wiping angle is at least 90°.

6. A method of entraining a plurality of particles of blast media in a flow of transport gas comprising the steps of:
   a. controlling, at a first location, a flow rate of the plurality of particles from a source of particles;
   b. comminuting, at a second location downstream of the first location, a plurality of the plurality of particles from each particle's respective initial size to a second size smaller than a predetermined size; and
   c. introducing, at a third location downstream of the second location, the particles into the flow of transport gas, wherein the step of introducing comprises using a feeding rotor to entrain the particles into the flow of transport gas, and wherein the step of introducing comprises sealing between the second location and the third location.

7. A method of entraining a plurality of particles of blast media in a flow of transport gas comprising the steps of:
   a. controlling, at a first location, a flow rate of the plurality of particles from a source of particles;
   b. comminuting, at a second location downstream of the first location, a plurality of the plurality of particles from each particle's respective initial size to a second size smaller than a predetermined size; and
   c. introducing, at a third location downstream of the second location, the particles into the flow of transport gas, wherein the step of introducing comprises using a feeding rotor to entrain the particles into the flow of transport gas, and wherein the feeding rotor is operated at a constant rotation speed.

8. A method of entraining a plurality of particles of blast media in a flow of transport gas comprising the steps of:
   a. controlling, at a first location, a flow rate of the plurality of particles from a source of particles;
   b. comminuting, at a second location downstream of the first location, a plurality of the plurality of particles from each particle's respective initial size to a second size smaller than a predetermined size; and
   c. introducing, at a third location downstream of the second location, the particles into the flow of transport gas, wherein the step of introducing comprises using a feeding rotor to entrain the particles into the flow of transport gas, and wherein the feeding rotor is rotated at a speed independent of the flow rate of the plurality of particles.

9. The method of claim 8, wherein the step of controlling the flow rate comprises using a metering element to control the flow rate.

10. A feeder assembly configured to transport cryogenic blast media from a source of cryogenic blast media into a flow of transport gas, the cryogenic blast media comprising a plurality of particles, each particle of the plurality of particles having a respective initial size, the feeder assembly comprising:
   a. a metering element
   b. a guide disposed adjacent the metering element, the guide configured to guide the particles into the metering element, the guide comprises a wiping edge disposed adjacent the metering element, the wiping edge configured to wipe across the metering element as the metering element moves, the wiping edge disposed at a wiping angle which is configured to not result in a nip line between the wiping edge and the metering element;

c. a feeding rotor;
d. a comminutor disposed between the metering element and the feeding rotor; and
e. a transport gas flow path through which the transport gas flows during operation of the feeder assembly, wherein the metering element is configured to:
   i. receive from a first region the cryogenic blast media from the source of cryogenic blast media;
   ii. control the rate of flow of the cryogenic blast media through the feeder assembly; and
   iii. discharge the cryogenic blast media to the comminutor;

wherein the comminutor is configured to receive the cryogenic blast media from the metering element and to reduce the size of a plurality of the plurality of particles from each particle's respective initial size to a second size which is smaller than a predetermined size; and wherein the feeding rotor is configured to:
   iv. receive the cryogenic-blast media discharged by the comminutor; and
   v. introduce the cryogenic blast media into the flow of transport gas in the transport gas flow path.

11. The feeder assembly of claim 10, wherein the comminutor comprises:

a. at least one first roller rotatable about a first axis, each said at least one first roller comprising a respective first peripheral surface, each respective first peripheral surface collectively comprising a plurality of first raised ridges;
b. at least one second roller rotatable about a second axis, each said at least one second roller comprising a respective second peripheral surface, each respective second peripheral surface collectively comprising a plurality of second raised ridges;
c. a gap defined between each respective first peripheral surface and each respective second peripheral surface; and
d. a converging region upstream of the gap defined by the gap, the at least one first roller and the at least one second roller wherein the plurality of first raised ridges and the plurality of second raised ridges form a diamond pattern in the converging region.

12. The feeder assembly of claim 10, wherein the feeding rotor is configured to be rotated at a constant speed independent of the rate of flow of the cryogenic blast media through the feeder assembly.

* * * * *